(12) United States Patent
Urakawa et al.

(10) Patent No.: US 7,660,211 B2
(45) Date of Patent: Feb. 9, 2010

(54) SERVO CONTROL APPARATUS, SERVO CONTROL METHOD, OPTICAL DISC APPARATUS AND VIDEO CAMERA RECORDER

(75) Inventors: Yoshiyuki Urakawa, Kanagawa (JP); Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 11/756,945

(22) Filed: Jun. 1, 2007

(65) Prior Publication Data

US 2007/0286033 A1 Dec. 13, 2007

(30) Foreign Application Priority Data

Jun. 13, 2006 (JP) .............................. 2006-163583

(51) Int. Cl.
*G11B 7/00* (2006.01)
(52) U.S. Cl. ................ 369/44.28; 369/44.34; 369/47.36
(58) Field of Classification Search ........................ None
See application file for complete search history.

(56) References Cited

U.S. PATENT DOCUMENTS

| | | | | |
|---|---|---|---|---|
| 5,231,550 A | * | 7/1993 | Hashimoto | 360/78.06 |
| 6,377,523 B2 | * | 4/2002 | Yanagi | 369/44.28 |
| 6,584,048 B1 | * | 6/2003 | Tateishi et al. | 369/44.28 |

FOREIGN PATENT DOCUMENTS

| | | |
|---|---|---|
| JP | 2-304782 | 12/1990 |
| JP | 03-288913 | 12/1991 |
| JP | 4-335272 | 11/1992 |
| JP | 6-259877 | 9/1994 |
| JP | 7-13629 | 1/1995 |
| JP | 08-249073 | 9/1996 |
| JP | 11-110048 | 4/1999 |
| JP | 11-161977 | 6/1999 |
| JP | 2000-137961 | 5/2000 |
| JP | 2002-140115 | 5/2002 |
| JP | 2003-157633 | 5/2003 |
| JP | 2003-259675 | 9/2003 |

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A servo control apparatus includes: a drive section that applies a thrust to move a driven object; a storage section that stores a control circuit output initial value; an approaching control section that moves the driven object toward a target position; an error signal detection section that detects an error signal varying according to a difference between the position of the driven object and the target position; a start position calculation section that calculates a start position of a servo control process; an arrival detection section that detects whether the driven object reaches the start position; a control circuit initial value calculation section that calculates a control circuit initial value of a control system and supplies it to a control circuit of the control system; and a servo control starting section that starts the servo control process when detecting that the driven object has reached the start position.

8 Claims, 12 Drawing Sheets

SERVO CONTROL APPARATUS, SERVO CONTROL METHOD, OPTICAL DISC APPARATUS AND VIDEO CAMERA RECORDER

CROSS REFERENCES TO RELATED APPLICATIONS

The present invention contains subject matter related to Japanese Patent Application JP2006-163583 filed in the Japanese Patent Office on Jun. 13, 2006, the entire contents of which being incorporated herein by reference.

BACKGROUND OF THE INVENTION

1. Field of the Invention

The present invention relates to a servo control apparatus, servo control method, optical disc apparatus and video camera recorder, and is preferably applied to an optical disc apparatus, for example.

2. Description of Related Art

An optical disc apparatus is usually designed to record on an optical disc, or a recording medium, information such as music and video data. In addition to that, the optical disc apparatus is used to read out the information from the optical disc. This type of apparatus has become widely used.

To record the information, the optical disc apparatus rotates the optical disc and emits an optical beam that is then focused on a target track on the optical disc. To reproduce the information, the optical disc apparatus detects the reflected optical beam.

For example, as shown in FIG. 9, an optical disc apparatus 1, under the control of a servo control section 2, emits from a laser diode 4 of an optical pickup 3 an optical beam L1 which then passes through a collimator lens 5, a polarization beam splitter 6, a raising mirror 7, a quarter wave length plate 8 and an objective lens 9 to be focused on a signal recording surface 10A of the optical disc 10.

In the optical disc apparatus 1, the optical beam L2, reflected on the signal recording surface 10A of the optical disc 10, passes through the objective lens 9, the quarter wave length plate 8 and the raising mirror 7. This reflection optical beam L2 subsequently gets into the polarization beam splitter 6.

The reflection optical beam L2 is then reflected by a polarization surface 6A of the polarization beam splitter 6. The reflection optical beam L2 subsequently passes through a collimator lens 11 and a hologram 12 and then reaches a photodetector 13. In the optical disc apparatus 1, the photodetector 13 detects the reflection optical beam L2. The optical disc apparatus 1 then produces a detection signal based on the intensity of the reflection optical beam L2 and then performs a predetermined signal process to reproduce information.

In the optical disc apparatus 1, the distance between the objective lens 9 and the optical disc 10 may vary. This is partly due to the unique characteristics of each optical disc 10 and the trembling of the surface of the optical disc 10. In other words, a focused focal location JF, a location on the signal recording surface 10A of the optical disc 10 on which the optical beam L1 through the objective lens 9 is focused may vary according to the unique characteristics of each optical disc 10 or the position of the signal recording surface 10A of the optical disc 10.

Accordingly, the optical disc apparatus 1 performs a servo control process to keep the distance between the objective lens 9 and the optical disc 10 at a constant level: an actuator 14 moves the objective lens 9 such that the objective lens 9 gets close to or away from the optical disc. Thus, the optical beam L1 is appropriately focused on the signal recording surface 10A of the optical disc 10 (this process is a so-called focusing).

Specifically, the optical disc apparatus 1 uses the method of Spot Size Detection (SSD) for the focusing process. As shown in FIG. 10A, the hologram 12 of the optical disc apparatus 1 divides the reflection optical beam L2 into a plus first order light L2A, a zero order light L2C and a minus first order light L2B. The focal distances of these light beams L2A, L2C and L2B are different from each other. Those light beams L2A, L2C and L2B are supplied to detection areas 15, 16 and 17 on the photodetector 13.

As shown in FIG. 10B, each of the detection areas 15 and 16 is divided into three sections, each of which photo-electrically converts the plus first order light L2A and the minus first order light L2B into detection signals S1A to S1C and S2A to S2C. The detection areas then supplies the detection signals S1A to S1C and S2A to S2C to the control section 2.

The servo control section 2 of the optical disc apparatus 1 controls a focus error signal detection circuit 21 to perform a calculation process using the detection signals S1A to S1C and S2A to S2C to produce a focus error signal SFE. The calculation is expressed as follows:

$$SFE = S2A + S2B + S1C - (S1A + S1B + S2C) \quad (1)$$

The servo control section 2 subsequently controls an analog-to-digital (A/D) converter 22 to convert the analog focus error signal SFE into a digital focus error data DFE and supplies the focus error data DFE to a focus servo control circuit 23.

The focus servo control circuit 23 generates, based on the focus error data DFE, control data DC which is used to control the actuator 14. A digital-to-analog (D/A) converter 24 converts the control data DC into an analog control signal SC and then supplies the control signal SC to an actuator drive circuit 25.

The actuator drive circuit 25 produces, based on the control signal SC, an actuator drive signal SA and then supplies the actuator drive signal SA to the actuator 14. The optical pickup 3 controls the actuator 14 in accordance with the actuator drive signal SA.

On the other hand, the focus servo control circuit 23 is designed to read out various data from a nonvolatile memory 26.

The photodetector 13 is located such that when the objective lens 9 of the optical disc apparatus 1 is focused on the signal recording surface 10A of the optical disc 10 (or on the focused focal location JF), the zero order light L2C is focused on the detection area 17 as shown in FIG. 10A. At this time, the focus position of the plus first order light L2A is behind the photodetector 13 (or the upper side of the diagram) while the focus position of the minus first order light L2B stops short of the photodetector 13 (or the lower side of the diagram).

If the objective lens 9 of the optical disc apparatus 1 does not align with the focused focal location JF, the focus positions of the zero order light L2C, plus first order light L2A and minus first order light L2B also change in accordance with the amount of the misalignment (i.e., upward or downward in the diagram). Accordingly, the intensity of the plus first order light L2A and minus first order light L2B, received by the detection areas 15 and 16, may change.

This means that the signal level of the focus error signal SFE change in accordance with the distance between the objective lens 9 and the optical disc 10: this represents a substantially S-shaped characteristic curve Q1 as shown in FIGS. 11A and 11B.

According to the equation (1) or the SSD method and the position of the photodetector 13, when the objective lens 9 is located at the focused focal location JF which allows the optical beam L1 to be focused on the signal recording surface 10A of the optical disc 10, the focus error signal SFE has a value of zero as shown in FIG. 11B.

The characteristic curve Q1 of the focus error signal SFE changes linearly around the focused focal location JF while the characteristic curve Q1 changes nonlinearly as it gets away from the focused focal location JF, and becoming close to zero.

Therefore, one can assume that only when the objective lens 9 is close to the focused focal location JF, the signal level of the focus error signal SFE is substantially proportional to the distance between the objective lens 9 and the focused focal location JF (hereinafter, the linear portion of the characteristic curve Q1 is also referred to as a "detection area AD").

The nonvolatile memory 26 of the servo control section 2 has memorized a coefficient COE which represents the correlation between the signal level of the focus error signal SFE and the distance between the objective lens 9 and the focused focal location JF.

When being located around the focused focal location (or inside the detection area AD), the servo control section 2 of the optical disc apparatus 1 calculates the distance between the objective lens 9 and the focused focal location JF using the coefficient COE and generates the actuator drive signal SA to make the focus error signal SFE (or the focus error data DFE) close to zero. The actuator 14 operates in accordance with the actuator drive signal SA and then moves the objective lens 9 toward the focused focal location JF (Servo Control).

In this manner, the control section 2 performs feedback control: the control section 2 generates the focus error signal SFE based on the detection signals S1A to S1C and S2A to S2C and then produces the actuator drive signal SA based on the focus error signal SFE to control the actuator 14.

Hereinafter, a closed loop including the photodetector 13, the servo control section 2 and the actuator 14 is also referred to as a "focus servo control system". In addition, the feedback control, a process performed by the actuator 14 based on the focus error signal SFE is also referred to as "focus servo control".

By the way, when the optical disc 10 is inserted or ejected from the optical disc apparatus 1, the servo control section 2 moves the objective lens 9 away from the optical disc 10 to the outside of the detection area AD to prevent contact and damage between the optical disc 10 and the objective lens 9.

Accordingly, the servo control section 2 controls, when the optical disc 10 is inserted, the actuator 14 to move the objective lens 9 toward the optical disc 10 such that the objective lens 9 is located substantially close to the focused focal location JF (or inside the detection area AD). In this manner, the servo control section 2 performs such a process as the so-called pull-in operation before starting the focus servo control process.

Specifically, the servo control section 2 uses the actuator drive circuit 25 to control the actuator 14. In addition, while detecting the focus error signal SFE (or the focus error data DFE) through the focus error signal detection circuit 21, the servo control section 2 moves the objective lens 9 toward the optical disc 10 at a constant speed.

At a time instant 0 when the signal level of the focus error signal SFE drops, as shown in FIG. 12, to below a predetermined value which is less than zero after rising from zero to a certain level, the control section 2 determines that the objective lens 9 has just passed through the focused focal location JF, or that the objective lens 9 is substantially located inside the detection area AD. In response to that, the control section 2 starts the focus servo control process of the actuator 14.

By the way, there is a demand for the control section 2 to start the playback and recording of the optical disc 10 as soon as possible by completing the pull-in operation in a short period of time. That is, it is desirable that as shown in FIG. 12 (dotted lines) for example, the objective lens 9 should be focused on the location JF as soon as possible after the start of the focus servo control process (i.e. after the time instant 0). This means a good transient response is desirable.

FIG. 13 is a schematic block diagram illustrating a focus servo control system of the optical disc apparatus 1.

A general type of a control circuit of an optical disc apparatus usually uses a second order filter including a low frequency emphasis filter and a high frequency phase advance filter. Accordingly, a control circuit 30K of the focus servo control system 30 has two state variables: a low-pass filter value fc1 and a high-pass filter value fc2. On the other hand, a controlled section 30P, controlled by the control circuit 30K, is equivalent to the actuator 14, holding two state variables, i.e., a location x and a velocity v.

As shown in FIG. 12, the optical disc apparatus 1 starts the focus servo control when the moving objective lens 9 is not at the focused focal location JF. The following describes the situation in which at the time instant 0 when the focus servo control is initiated, the location x and velocity v of the controlled section are not zero (i.e., Initial value response).

FIG. 14 is a block diagram illustrating the state space of a focus servo control system, which is equivalent to the system shown in FIG. 13. The state of the focus servo control system 31 can be represented by four state variables (a low-pass filter value $f_L$, a high-pass filter value $f_H$, a location x and a velocity v) as follows:

$$\vec{X} = \begin{pmatrix} f_{c1} \\ f_{c2} \\ x \\ v \end{pmatrix} \quad (2)$$

Using inverse Laplace transform, an output y(t) of the focus servo control system 31 at a time instant t (later than the time instant 0 [FIG. 12]) is also represented as follows:

$$y(t) = L^{-1}[C \cdot (sI-A)^{-1}] \vec{x}(0) \quad (3)$$

where the output y(t) is a value representing the position of the objective lens 9 with respect to the focused focal location JF.

A state X(0) of the equation (3) represents the initial value of the focus servo control system 31 as a whole. It is evident that the output y(t) be changed in accordance with the state X(0).

FIGS. 15A to 15D are schematic diagrams illustrating each response of the state variables (the low-pass filter value $f_L$, the high-pass filter value $f_H$, the location x and the velocity v) of the state X(0) of the focus servo control system 31. When being superimposed, they are represented as an output y(t) as shown in FIG. 15E.

Generally, the low-pass filter value $f_L(0)$ and the high-pass filter value $f_H(0)$, the initial values of the control circuit 31K of the focus servo control system 31 are zero.

By contrast, Patent Document 1 (Jpn. Pat. No. 2685622 [Pages 4 to 5]), for example, discloses an initial value compensation method capable of obtaining a good response: setting an appropriate value as the initial value of the control circuit 31K, the output y(t) can converge in a short period of time.

FIG. 16 shows the configuration of the focus servo control system of the optical disc apparatus 1, including digital filters: it is taken into consideration that the focus servo control circuit 23 of the control section 2 performs digital calculation processes.

In the focus servo control system 32 shown in FIG. 16, the low-pass filter value $f_L(0)$ and the high-pass filter value $f_H(0)$ are respectively supplied to a register 32RL of a low-pass filter section 32L and a register 32RH of a high-pass filter section 32H as the initial values.

In the initial value compensation method, the initial values of the control circuit (the low-pass filter value $f_L(0)$ and the high-pass filter value $f_H(0)$) are represented by a function using the initial values of the controlled section (the location $x(0)$ and the velocity $v(0)$) as follows:

$$\begin{pmatrix} f_{c1}(0) \\ f_{c2}(0) \end{pmatrix} = \alpha \begin{pmatrix} x(0) \\ v(0) \end{pmatrix} = \begin{pmatrix} k_{11} & k_{12} \\ k_{21} & k_{22} \end{pmatrix} \begin{pmatrix} x(0) \\ v(0) \end{pmatrix} \quad (4)$$

In this case, the location x of the controlled section can be calculated from the focus error signal SFE (or the focus error data DFE) and the coefficient COE. The velocity v can be calculated in the following manner: the location x of the controlled section is continuously calculated over time, and the velocity v is calculated based on its variation and the elapsed time.

In fact, the location $x(0)$ and the velocity $v(0)$, the initial values of the controlled section can be assumed as the location x and velocity v of the objective lens 9 at the time instant 0, which are calculated based on the focus error data DFE.

In addition, a matrix α (i.e., coefficients $K_{11}$, $k_{12}$, $k_{21}$ and $k_{22}$) of the equation (4) is determined based on the response characteristics of the actuator 14 of the optical disc apparatus 1, the weight of the objective lens 9 and the like. It can be calculated using design methods such as an evaluation value function minimum method or a zero point specification method.

In the initial value compensation method, using the location $x(0)$ and the velocity $v(0)$ at a timing when the focus servo control is initiated, the calculation of the equation (4) is performed to obtain the low-pass filter value $f_L(0)$ and the high-pass filter value $f_H(0)$ to present the best output y(t).

SUMMARY OF THE INVENTION

In this manner, the initial value compensation method determines the low-pass filter value $f_L(0)$ and the high-pass filter value $f_H(0)$. This means that the method determines a thrust to be applied by the actuator 14 to the objective lens 9 at the time instant 0 when the actuator 14 of the optical disc apparatus 1 starts the focus servo control.

FIG. 17A shows a result of measuring the position of the objective lens 9 with respect to the focused focal location JF when the optical disc apparatus 1 performs the pull-in operation and starts the focus servo control, while FIG. 17B shows a result of measuring the thrust that the actuator 14 applies to the objective lens 9.

In FIG. 17A, assume that a time when the focus error signal SFE becomes a predetermined value less than zero be the time instant 0. The optical disc apparatus 1, at the time instant 0, starts the servo control to bring the objective lens 9 (whose position is represented as the output y(t)) to the focused focal location JF.

As shown in FIG. 17B, the actuator 14, at the time instant 0, applies the thrust to bring back the objective lens 9 which was moving away from the focused focal location. This thrust could be relatively a large value.

In this case, there is a possibility that the thrust (or the initial value being output from the control circuit) may exceed the upper limitation that the actuator 14 can apply. That is, the thrust of the actuator 14 may be saturated.

In this case, the actuator 14 may not be able to apply the sufficient thrust to the objective lens 9 at the time instant 0. As a result, the premise of the initial value compensation method may not be satisfied: the response characteristics of the output y(t) may decline and it may take a longer time to bring the objective lens 9 to the focused focal location JF.

The present invention has been made in view of the above points and is intended to provide a servo control apparatus, servo control method, optical disc apparatus and video camera recorder capable of stabilizing the transient response of the servo control system.

In one aspect of the present invention, a servo control apparatus includes: a drive section that applies a thrust to a driven object to move the driven object in a predetermined direction; a storage section that stores a control circuit output initial value that the drive section first applies; an approaching control section that controls the drive section to move the driven object toward a target position; an error signal detection section that detects an error signal varying according to a difference between the position of the driven object and the target position; a start position calculation section that calculates, based on a velocity of the driven object moving toward the target position and the control circuit output initial value, a start position of a servo control process that brings the driven object to the target position, the velocity of the driven object being calculated based on the error signal; an arrival detection section that detects, based on the error signal, whether the driven object reaches the start position; a control circuit initial value calculation section that calculates, using a velocity of the driven object that has reached the start position and the start position, a control circuit initial value of a control system related to the driven object and supplies the control circuit initial value to a control circuit of the control system; and a servo control starting section that starts the servo control process when detecting that the driven object has reached the start position.

Accordingly, the start position can be calculated under the limitation of the control circuit output initial value. In addition, the output of the control circuit when the servo control process is initiated at the start position can be assumed as the control circuit output initial value, which is within a range of values the drive section can apply. This prevents the saturation of the thrust of the drive section while bringing the driven object onto the target position in a very short period of time.

In another aspect of the present invention, a servo control method includes: an approaching control step of moving a driven object toward a target position using a drive section that applies a thrust to the driven object to move the driven object in a predetermined direction; an error signal detection step of detecting an error signal varying according to a difference between the position of the driven object and the target position; a start position calculation step of calculating, based on a velocity of the driven object moving toward the target position and a control circuit output initial value that the drive section first applies, a start position of a servo control process that brings the driven object to the target position, the velocity of the driven object being calculated based on the error signal and the control circuit output initial value being within a range of values that the drive section can apply; an arrival detection step of detecting, based on the error signal, whether the driven object reaches the start position; a control circuit initial value calculation step of calculating, using a velocity of the driven object that has reached the start position and the start position, a control circuit initial value of a control system related to the driven object and supplying the control circuit initial value to a control circuit of the control system; and a servo control starting step of starting the servo control process when detecting that the driven object has reached the start position.

Accordingly, the start position can be calculated under the limitation of the control circuit output initial value. In addition, the output of the control circuit when the servo control process is initiated at the start position can be assumed as the control circuit output initial value, which is within a range of values the drive section can apply. This prevents the saturation of the thrust of the drive section while bringing the driven object onto the target position in a very short period of time.

In another aspect of the present invention, an optical disc apparatus that records or reproduces information from a storage medium or an optical disc by focusing an emitted optical beam on the optical disc, the optical disc apparatus including: an actuator that applies a thrust to an objective lens collecting the optical beam toward a signal recording surface of the optical disc to move the objective lens such that the objective lens gets close or away from the optical disc; a storage section that stores a control circuit output initial value that the actuator first applies, the control circuit output initial value being within a range of values that the actuator can apply; an approaching control section that controls the actuator to move the objective lens toward a focused focal position when reproduction or recording of the information on the optical disc is initiated; an error signal detection section that detects an error signal varying according to a difference between the position of the objective lens and the focused focal position; a start position calculation section that calculates, based on a velocity of the objective lens moving toward the focused focal position and the control circuit output initial value, a start position of a servo control process that brings the objective lens to the focused focal position, the velocity of the objective lens being calculated based on the error signal; an arrival detection section that detects, based on the error signal, whether the objective lens reaches the start position; a control circuit initial value calculation section that calculates, using a velocity of the objective lens that has reached the start position and the start position, a control circuit initial value represented in a block diagram of a control system related to the objective lens and supplies the control circuit initial value to a control circuit represented in the block diagram; and a servo control starting section that starts the servo control process when detecting that the objective lens has reached the start position.

Accordingly, the start position can be calculated under the limitation of the control circuit output initial value. In addition, the output of the control circuit when the servo control process is initiated at the start position can be assumed as the control circuit output initial value, which is within a range of values the actuator can apply. This prevents the saturation of the thrust of the actuator while bringing the objective lens onto the focused focal position in a very short period of time.

In another aspect of the present invention, a video camera recorder that generates a video signal by shooting a video image and records the video signal on a storage medium or an optical disc by focusing an emitted optical beam on the optical disc, the video camera recorder includes: an image pickup section that converts the video image into the video signal; an actuator that applies a thrust to an objective lens collecting the optical beam toward a signal recording surface of the optical disc to move the objective lens such that the objective lens gets close or away from the optical disc; a storage section that stores a control circuit output initial value that the actuator first applies, the control circuit output initial value being within a range of values that the actuator can apply; an approaching control section that controls the actuator to move the objective lens from a position distant from a focused focal position of the optical disc toward the focused focal position when reproduction or recording of the information on the optical disc is initiated; an error signal detection section that detects an error signal varying according to a difference between the position of the objective lens and the focused focal position; a start position calculation section that calculates, based on a velocity of the objective lens moving toward the focused focal position and the control circuit output initial value, a start position of a servo control process in which the actuator brings the objective lens to the focused focal position in accordance with the error signal, the velocity of the objective lens being calculated based on the error signal; an arrival detection section that detects, based on the error signal, whether the objective lens reaches the start position; a control circuit initial value calculation section that calculates, using a velocity of the objective lens that has reached the start position and the start position, a control circuit initial value represented in a block diagram of a control system related to the objective lens and supplies the control circuit initial value to a control circuit represented in the block diagram; and a servo control starting section that starts the servo control process when detecting that the objective lens has reached the start position.

Accordingly, the start position can be calculated under the limitation of the control circuit output initial value. In addition, the output of the control circuit when the servo control process is initiated at the start position can be assumed as the control circuit output initial value, which is within a range of values the actuator can apply. This prevents the saturation of the thrust of the actuator while bringing the objective lens onto the focused focal position in a very short period of time.

According to an embodiment of the present invention, the start position can be calculated under the limitation of the control circuit output initial value. In addition, the output of the control circuit when the servo control process is initiated at the start position can be assumed as the control circuit output initial value, which is within a range of values the drive section can apply. This prevents the saturation of the thrust of the drive section while bringing the driven object onto the target position in a very short period of time. Thus, the servo control apparatus and servo control method according to an embodiment of the present invention can stabilize the transient response of the servo control system.

In addition, according to an embodiment of the present invention, the start position can be calculated under the limitation of the control circuit output initial value. In addition, the output of the control circuit when the servo control process is initiated at the start position can be assumed as the control circuit output initial value, which is within a range of values the actuator can apply. This prevents the saturation of the thrust of the actuator while bringing the objective lens onto the focused focal position in a very short period of time. Thus, the optical disc apparatus and video camera recorder according to an embodiment of the present invention can stabilize the transient response of the servo control system.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

An embodiment of the present invention will be described in detail with reference to the accompanying drawings.

(1) Basic Principles

Figure 1:
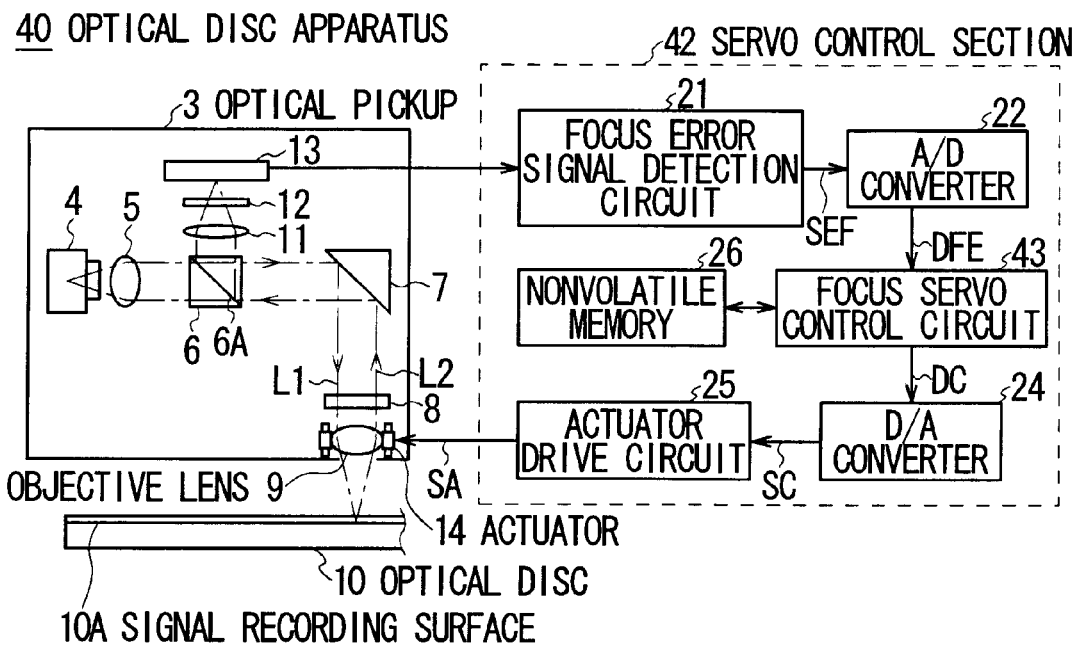
FIG. 1 is a schematic diagram illustrating the configuration of a focus servo control system of an optical disc apparatus.
Figure 9:
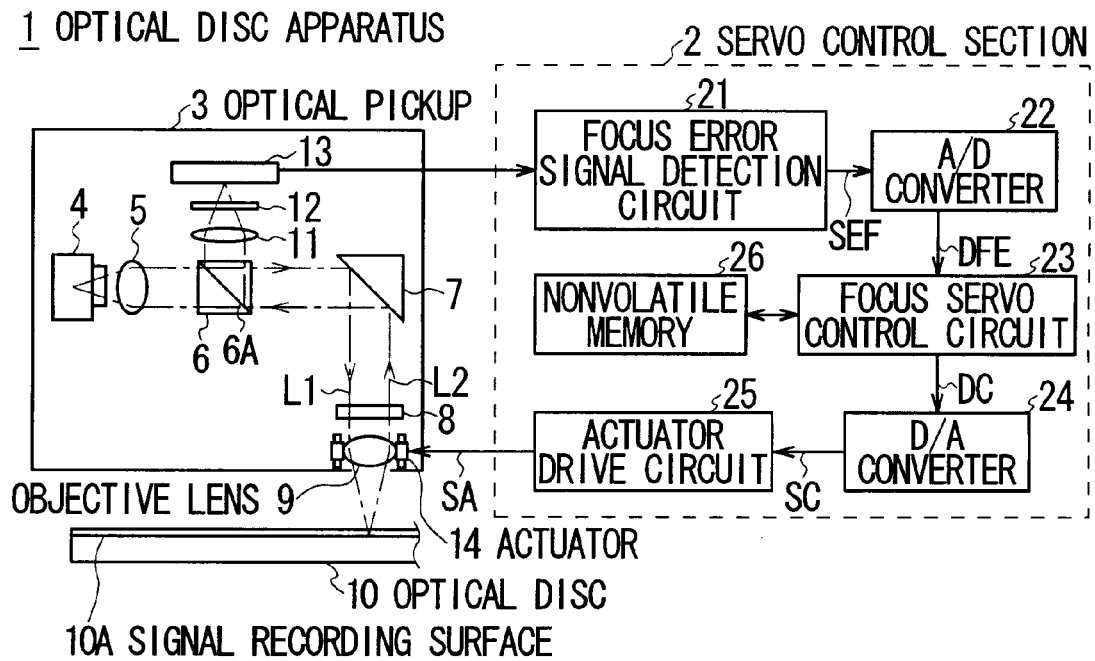
FIG. 9 is a schematic diagram illustrating the configuration of a focus servo control system of a typical optical disc apparatus.
Figure 10A:
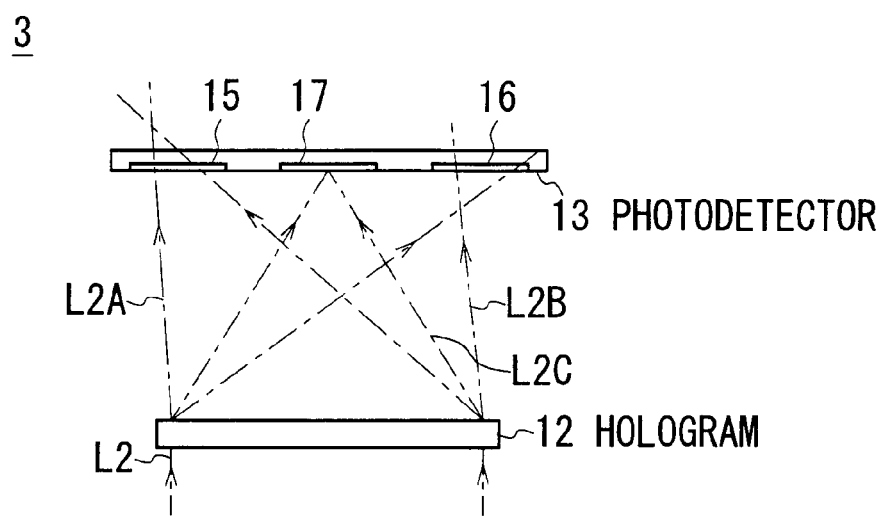
FIGS. 10A and 10B are schematic diagrams illustrating detection of the reflection of an optical beam.
Figure 10B:
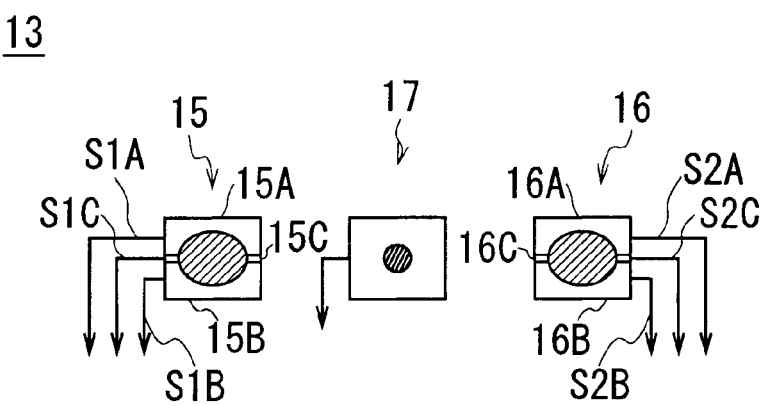

The basic principle will be described below. FIG. 1 shows an optical disc apparatus 40. The parts of FIG. 1 are represented by the same reference numerals and symbols as the corresponding parts of the FIG. 9.

(1-1) Configuration of the Optical Disc Apparatus

As shown in FIG. 1, the optical disc apparatus 40 has the same functions as the optical disc apparatus 1 (FIG. 9), capable of recording and reproducing information from the optical disc 10.

A servo control section 42 of the optical disc apparatus 40, which is equivalent to the servo control section 2 of the optical disc apparatus 1, takes overall control of the apparatus 40. The servo control section 42 has substantially the same configuration as the servo control section 2 except the following: the servo control section 42 includes, instead of the focus servo control circuit 23, the focus servo control circuit 43.

The servo control section 42 generates a focus error signal SFE based on the detection signals S1A to S1C and S2A to S2C supplied from the photodetector 13. Based on the focus error signal SFE, the focus servo control circuit 43 produces an actuator drive signal SA to perform a feedback control of the actuator 14 (i.e., a focus servo control).

Figure 2:
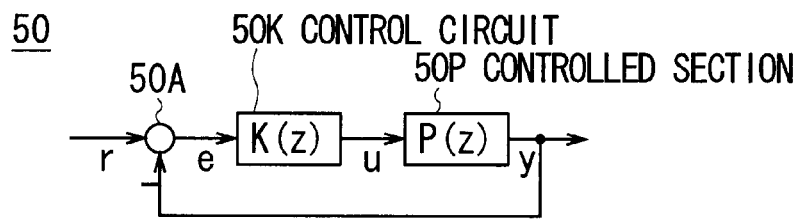
FIG. 2 is a schematic block diagram illustrating a digital-controlled focus servo control system.

The focus servo control circuit 43 performs the digital focus servo control. Accordingly, the basic configuration of a focus servo control system of the optical disc apparatus 40 can be represented as a focus servo control system 50, as shown in FIG. 2, including an accumulator 50A, a control circuit 50K and a controlled section 50P.

The accumulator 50A of the focus servo control system 50 calculates an error signal e indicating a difference between an output y representing the position of the objective lens 9 with respect to a predetermined location and a target value r to which the objective lens 9 is preferably set to (the target value r is equivalent to the focused focal location JF). The error signal e (or the focus error data DFE) is supplied to the control circuit 50K.

The control circuit 50K is equivalent to the focus servo control circuit 43. Based on the error signal e, the control circuit 50K produces a control circuit output u (equivalent to the actuator drive data DA). Based on the control circuit output u, the control circuit 50K controls the controlled section 50P, which is equivalent to the actuator 14.

In fact, the focus servo control system 50 controls the controlled section 50P such that the error signal e becomes zero. In this manner, the output y is brought to the target value r.

That also means that the optical disc apparatus 40 produces the actuator drive data DA (or the actuator drive signal SA) such that the focus error data DFE (or the focus error signal SFE) becomes zero to move the objective lens 9 toward the focused focal location JF.

Using the state space representation method with state variables $A_{cz}$, $B_{cz}$, $C_{cz}$, and $D_{cz}$ and a clock k of the digital control system, the control circuit 50K can be represented as follows:

$$X_{cz}(k+1)=A_{cz} \cdot X_{cz}(k)+B_{cz} \cdot (r(k)-y(k)) \quad (5)$$

and $$u(k)=C_{cz} \cdot X_{cz}(k)+D_{cz}(r(k)-y(k)) \quad (6)$$

In addition, using the state space representation method with state variables $A_{pz}$, $B_{pz}$, and $C_{pz}$ and the clock k, the controlled section 50P can be represented as follows:

$$X_{pz}(k+1)=A_{pz} \cdot X_{pz}(k)+B_{pz} \cdot u(k) \quad (7)$$

and $$y(k)=C_{pz} \cdot X_{pz}(k) \quad (8)$$

In addition, in a similar way to the above state space representation, the focus servo control system 50 can be expressed by the following equations (9) and (10), which are the combinations of the equations (5) to (8):

$$\begin{pmatrix} X_{cz}(k+1) \\ X_{pz}(k+1) \end{pmatrix} = \begin{pmatrix} A_{cz} & -B_{cz} \cdot C_{pz} \\ B_{pz} \cdot C_{cz} & A_{pz} - B_{pz} \cdot D_{cz} \cdot C_{pz} \end{pmatrix} \begin{pmatrix} X_{cz}(k) \\ X_{pzz}(k) \end{pmatrix} + \begin{pmatrix} B_{cz} \\ B_{pz} \cdot D_{cz} \end{pmatrix} r(k)$$
$$\equiv A_z \cdot X_{mz}(k) + B_z \cdot r(k)$$
(9)

and $$y(k) = \begin{pmatrix} 0 & C_{pz} \end{pmatrix} \begin{pmatrix} X_{cz}(k) \\ X_{pz}(k) \end{pmatrix}$$
$$\equiv C_z \cdot X_{mz}(k)$$
(10)

Figure 3:
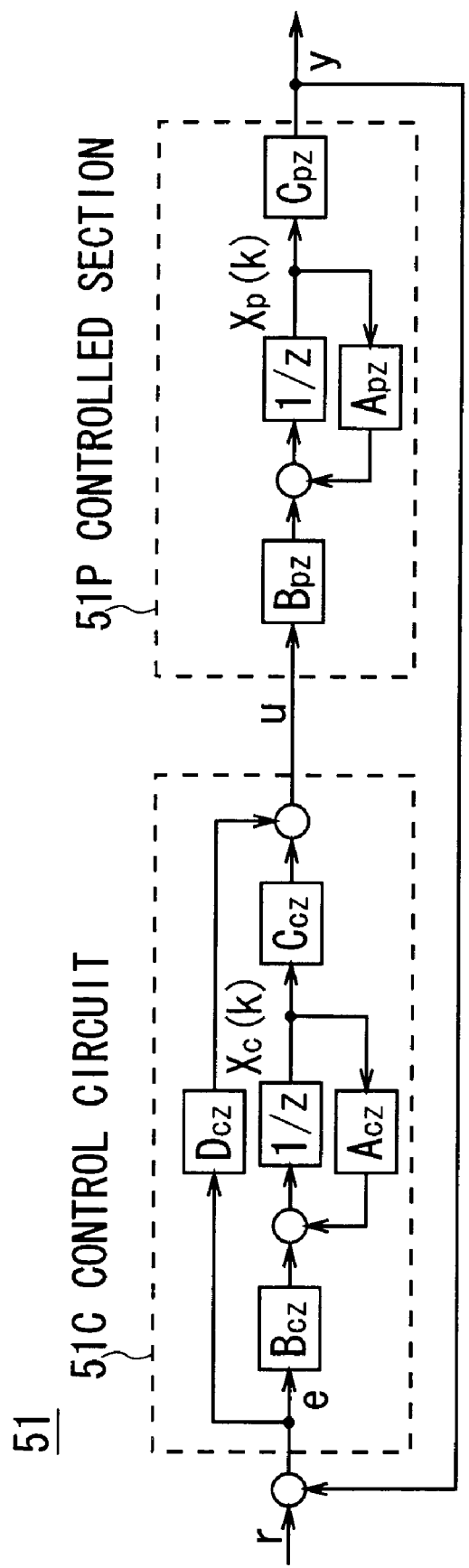
FIG. 3 is a schematic block diagram showing the state space representation of the focus servo control system.

FIG. 3 is a block diagram showing the state space representation based on the equations (9) and (10). The focus servo control system 51 includes a control circuit 51C and a controlled section 51P.

By the way, the state variables $A_{cz}$, $B_{cz}$, $C_{cz}$, and $D_{cz}$ and the state variables $A_{pz}$, $B_{pz}$, and $C_{pz}$ are determined according to the characteristics of the actuator 14, the weight of the objective lens 9 and the like. During the process of designing the optical disc apparatus 40, the state variables $A_{cz}$, $B_{cz}$, $C_{cz}$, and $D_{cz}$ and the state variables $A_{pz}$, $B_{pz}$, and $C_{pz}$ may be calculated and stored in the nonvolatile memory 26.

(1-2) Application of the Initial Value Compensation Method

The following describes the application of the above initial value compensation method to the focus servo control system 51. This description is based on Non-Patent Document 1, "Design of Initial Value Compensation Servo System with Zero Point Specified" (Yamaguchi Takashi and et al. "Basic Study of Initial Value Compensation for Switching Servo Modes on Head Positioning Servo System of Magnetic Disk Device." Proceeding of The Society of Instrument and Control Engineers Vol. 29, No. 7, p 792-799, 1993).

Using the initial values $(X_{cx}(0), X_{pz}(0))$ with clock k=0 and a predetermined transfer function, an output y of the focus servo control system 51 can be expressed as follows:

$$y = C_z \cdot (zI - A_z)^{-1} \cdot z \cdot \begin{pmatrix} X_{cz}(0) \\ X_{pz}(0) \end{pmatrix}$$
(11)

Since the focus servo control system 51 is a digital control system with discrete-time control, the Z transformation is used in the equation (11).

On the other hand, in the initial value compensation method, the initial value $X_c(0)$ of the control circuit 51C is expressed by a function containing the initial value $X_p(0)$ of the controlled section 51P as indicated by the following equation (12):

$$X_{cz}(0) = \alpha X_{pz}(0)$$
(12)

By the way, as mentioned above, a control circuit of a disc apparatus uses a second order filter including a low frequency emphasis filter and a high frequency phase advance filter. In addition, the state of the controlled section or the actuator 14 (FIG. 1) is expressed using the location x(k) and the velocity v(k) of the objective lens 9 with the clock k.

Assume that the low-pass filter value and high-pass filter value of the control circuit 51C are $f_L(k)$ and $f_H(k)$, respectively. Replacing the terms of the equation (12) with them in accordance with the focus servo control system of the optical disc apparatus 40 produces the following equation (13) with four coefficients $k_{11}$, $k_{12}$, $k_{21}$ and $k_{22}$:

$$\begin{pmatrix} f_L(0) \\ f_H(0) \end{pmatrix} = \begin{pmatrix} k_{11} & k_{12} \\ k_{21} & k_{22} \end{pmatrix} \begin{pmatrix} x(0) \\ v(0) \end{pmatrix}$$
(13)

Using the equation (12), the transfer function of the equation (11) is expressed as follows:

$$y = C_z \cdot (zI - A_z)^{-1} \cdot z \cdot \begin{pmatrix} \alpha \\ I \end{pmatrix} X_{pz}(0)$$
(14)

Using the four coefficients $\omega 1(z)$, $\omega 2(z)$, $\omega 3(z)$ and $\omega 4(z)$, a part of the equation (13) is defined as follows:

$$C_z \cdot (zI - A_z)^{-1} \cdot z \equiv \frac{1}{\det(zI - A_z)} \begin{pmatrix} \omega_1(z) & \omega_2(z) & \omega_3(z) & \omega_4(z) \end{pmatrix}$$
(15)

Using the equations (14) and (15), the output y of the equation (7) is expressed as follows:

$$y = \frac{1}{\det(zI - A_z)} \begin{pmatrix} \omega_1(z) & \omega_2(z) & \omega_3(z) & \omega_4(z) \end{pmatrix} \begin{pmatrix} \alpha \\ I \end{pmatrix} X_{pz}(0)$$
$$= \frac{(\omega_1(z)k_{11} + \omega_2(z)k_{21} + \omega_3(z) \quad \omega_1(z)k_{12} + \omega_2(z)k_{22} + \omega_4(z))}{\det(zI - A_z)} X_{pz}(0)$$
(16)

The transfer function of the equation (16) is in a fractional expression. It is evident that the initial value response, or the initial value of the output y, is determined by the root of the denominator (or the pole of the control system) and the root of the numerator (or the zero point of the equation (16)).

Accordingly, the following describes, as a basic principle of the initial value compensation method, a method of obtaining a good initial value response, in which the position of the zero point moves by changing the coefficients $k_{11}$, $k_{12}$, $k_{21}$ and $k_{22}$ of the matrix α. Generally, the coefficients $k_{11}$, $k_{12}$, $k_{21}$ and $k_{22}$ are calculated such that the zero points compensate for the so-called late pole and vibrating pole.

The following describes a method of calculating the coefficients $k_{11}$, $k_{12}$, $k_{21}$ and $k_{22}$ to bring a desired zero point. When the specified zero points are z1 and z2, a pair of the following simultaneous equations (17a), (17b), (18a) and (18b) are obtained from the numerator of the equation (16):

$$\begin{cases} \omega_1(z_1)k_{11} + \omega_2(z_1)k_{21} + \omega_3(z_1) = 0 \\ \omega_1(z_2)k_{11} + \omega_2(z_2)k_{21} + \omega_3(z_2) = 0 \end{cases}$$
(17a)
(17b)

and $$\begin{cases} \omega_1(z_1)k_{12} + \omega_2(z_1)k_{22} + \omega_4(z_1) = 0 \\ \omega_1(z_2)k_{12} + \omega_2(z_2)k_{22} + \omega_4(z_2) = 0 \end{cases}$$
(18a)
(18b)

By solving the simultaneous equations (17a) and (17b), the coefficients $k_{21}$ and $k_{11}$ are obtained as follows:

$$k_{21} = -\frac{\omega_3(z_2) - \frac{\omega_1(z_2)}{\omega_1(z_1)}\omega_3(z_1)}{\omega_2(z_2) - \frac{\omega_1(z_2)}{\omega_1(z_1)}\omega_2(z_1)} \quad (19)$$

and $$k_{11} = \frac{-k_{21}\omega_2(z_1) - \omega_3(z_1)}{\omega_1(z_1)} \quad (20)$$

Similarly, by solving the simultaneous equations (18a) and (18b), the coefficients $k_{22}$ and $k_{12}$ are obtained as follows:

$$k_{22} = -\frac{\omega_4(z_2) - \frac{\omega_1(z_2)}{\omega_1(z_1)}\omega_4(z_1)}{\omega_2(z_2) - \frac{\omega_1(z_2)}{\omega_1(z_1)}\omega_2(z_1)} \quad (21)$$

and $$k_{12} = \frac{-k_{22}\omega_2(z_1) - \omega_4(z_1)}{\omega_1(z_1)} \quad (22)$$

By the way, it is evident from the equations (19) to (22) that the coefficients $k_{11}$, $k_{12}$, $k_{21}$ and $k_{22}$ can be previously calculated after the values related to the focus servo control system are determined. Accordingly, the coefficients $k_{11}$, $k_{12}$, $k_{21}$ and $k_{22}$ obtained as a result of the calculation of the equations (19) to (22) are stored in the nonvolatile memory 26 (FIG. 1).

In the initial value compensation method, substitution of the coefficients $k_{11}$, $k_{12}$, $k_{21}$ and $k_{22}$ and the location x(0) and velocity v(0) of the objective lens 9 into the equation (13) gives the low-pass filter value $f_L(0)$ and high-pass filter value $f_H(0)$ of the control circuit 51C at the time instant 0: the coefficients $k_{11}$, $k_{12}$, $k_{21}$ and $k_{22}$ are calculated based on the equations (19) to (22); and the location x(0) and velocity v(0) of the objective lens 9 are values at the time instant 0 when the servo control is initiated. The low-pass filter value $f_L(0)$ and high-pass filter value $f_H(0)$ of the control circuit 51C are collectively referred to as a "control circuit initial value f(0)".

The focus servo control system 51 supplies the control circuit initial value f(0) to the control circuit 51C to start the focus servo control. This presents a good response such that the objective lens 9 is brought to the focused focal location JF in a short period of time.

(1-3) Initial Values Based on the Focus Error Signals

By the way, the optical disc apparatus 40 (FIG. 1) does not include sensors to detect the location x and velocity v of the objective lens 9. This means that the apparatus may not be able to directly obtain the location x and the velocity v.

Figures 11A, 11B:
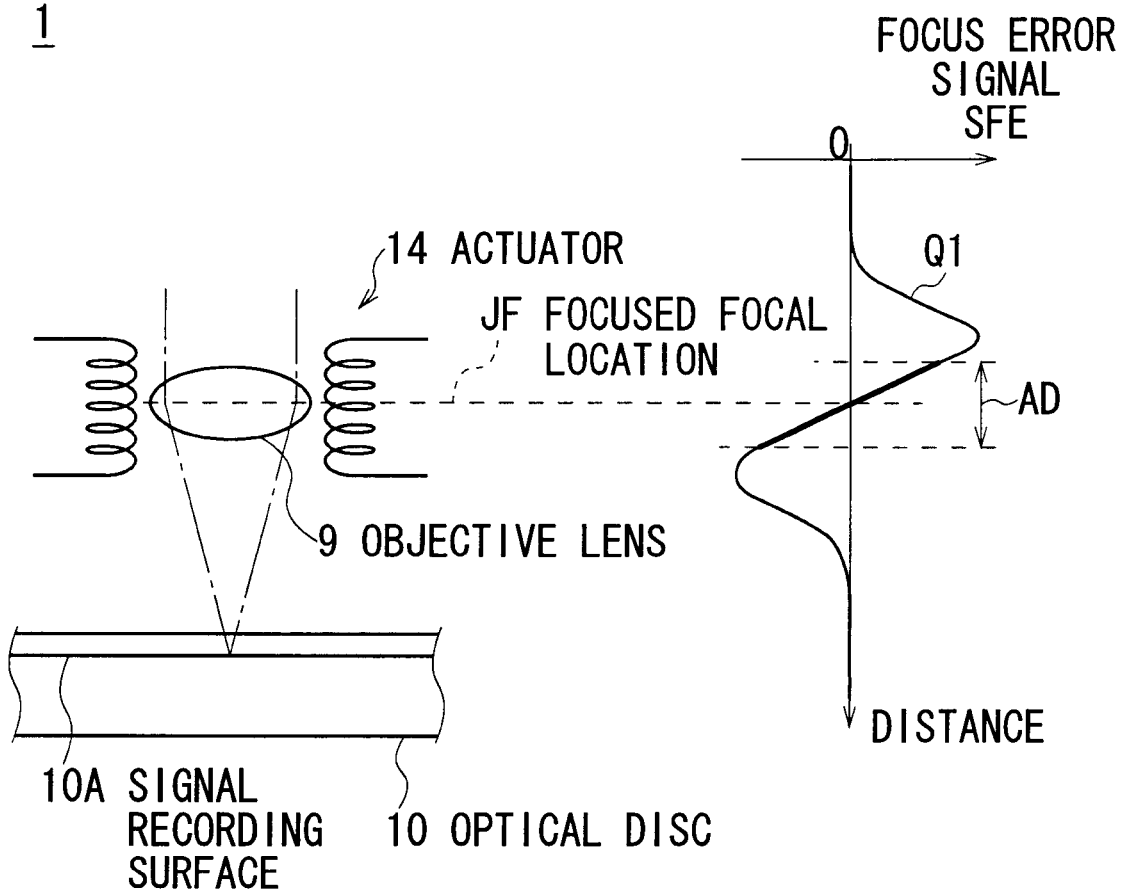
FIGS. 11A and 11B are schematic diagrams illustrating correlation between the position of an objective lens and a focus error signal.
Figure 12:
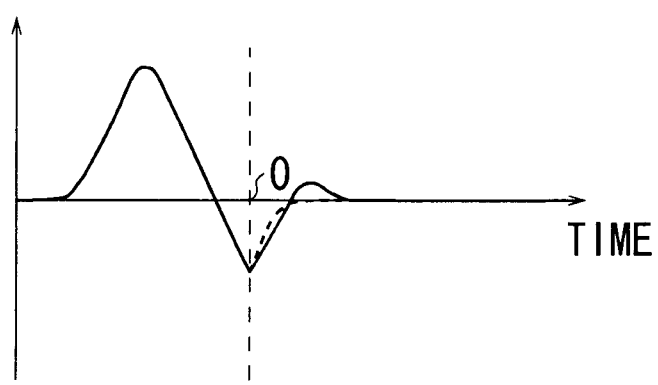
FIG. 12 is a schematic diagram illustrating the start of a focus servo control process and an initial response.
Figure 13:
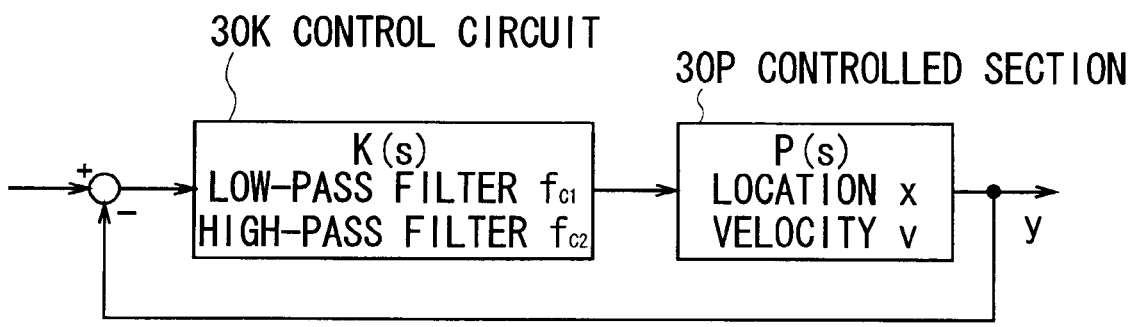
FIG. 13 is a schematic block diagram illustrating the focus servo control system.
Figure 14:
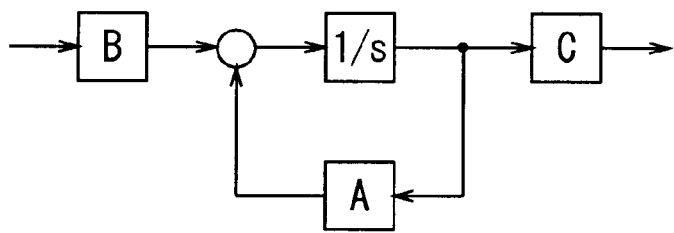
FIG. 14 is a schematic block diagram showing the state space representation of the focus servo control system.
Figure 15A:
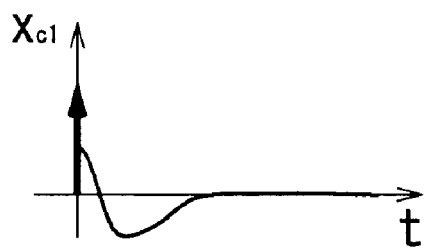
FIGS. 15A to 15E are schematic diagrams illustrating a response with an initial value of a control circuit.
Figure 15B:
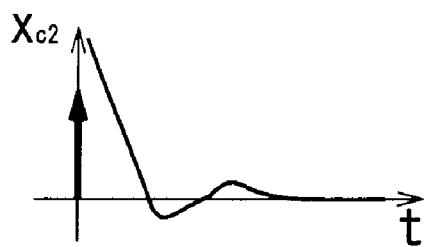
Figure 15C:
Figure 15D:
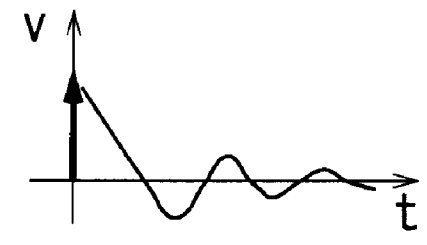
Figure 15E:
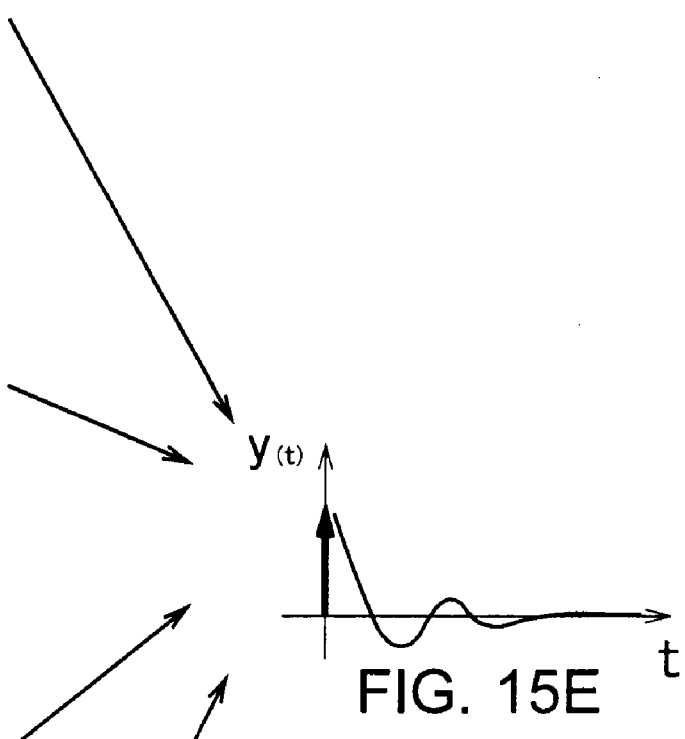
Figure 16:
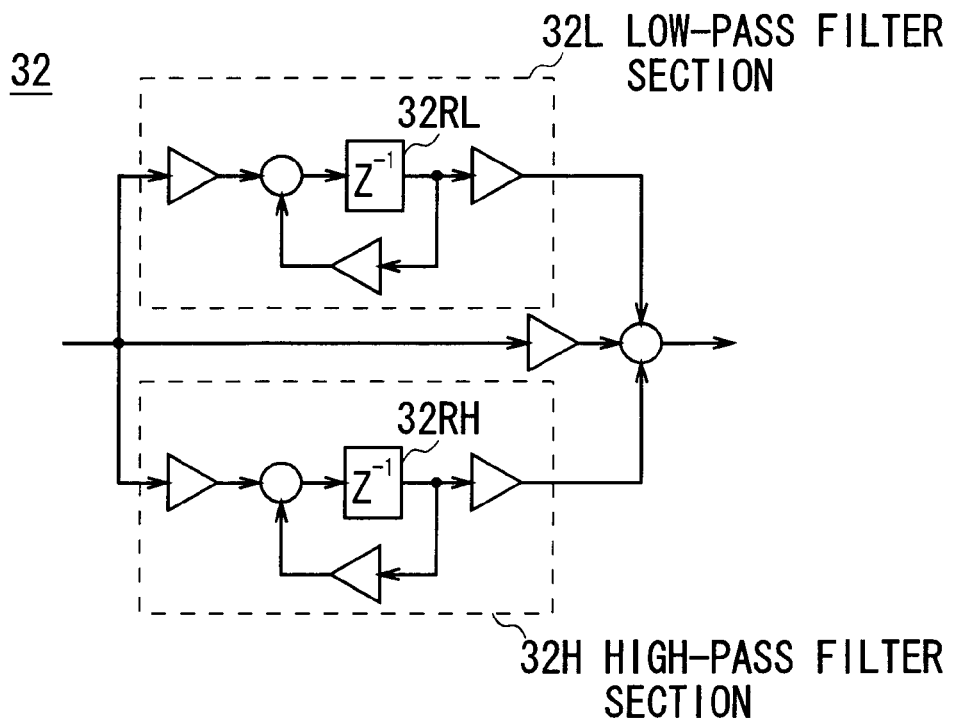
FIG. 16 is a schematic block diagram illustrating a focus servo control system including digital filters.

However, in the detection area AD of the optical disc apparatus 40, the signal level of the focus error signal SFE is proportional to the distance between the objective lens 9 and the focused focal location JF, like the optical disc apparatus 1 (FIG. 9) as shown in FIGS. 11A and 11B.

Accordingly, the optical disc apparatus 40 assumes that the signal level of the focus error signal SFE (or the focus error data DFE) represent the location x with respect to the focused focal location JF. For ease of explanation, the signal level of the focus error signal SFE (or the focus error data DFE) will be also expressed as a conversion location e(k).

Division of the difference between the conversion locations e(k) of each clock k by a sampling time T (or a period of time equivalent to one clock) gives a conversion velocity $e_v(k)$ as follows:

$$e_v(k) = \frac{e(k) - e(k-1)}{T} \quad (23)$$

The conversion velocity $e_v(k)$ can be regarded as the velocity v of the objective lens 9 when the objective lens 9 is located inside the detection area AD in FIG. 11B.

Replacing the location x of the equation (13) with the conversion location e(k) and the velocity v with the conversion velocity $e_v(k)$ presents the following equation (24):

$$\begin{pmatrix} f_L(0) \\ f_H(0) \end{pmatrix} = \begin{pmatrix} k_{11} & k_{12} \\ k_{21} & k_{22} \end{pmatrix} \begin{pmatrix} e(0) \\ e_v(0) \end{pmatrix} \quad (24)$$

By the way, using the low-pass filter value $f_L(0)$ and the high-pass filter value $f_H(0)$, the output of the control circuit 51C (FIG. 3) at clock 0, or the control circuit output initial value u(0), is expressed as follows:

$$u(0) = C_{cz}\begin{pmatrix} f_L(0) \\ f_H(0) \end{pmatrix} + D_{cz}(r(0) - y(0)) \quad (25)$$

$$= C_{cz}\begin{pmatrix} f_L(0) \\ f_H(0) \end{pmatrix} + D_{cz}e(0)$$

If the state of the controlled section 51P is expressed by the location x(k) and the velocity v(k), the following equation is obtained: $C_{pz}=(1\;0)$. Based on that, the following is defined: $C_{cz}=(C_{cz1}\;C_{cz2})$. In addition, using the equation (23), solving the equation (25) for the conversion location e(k) and the conversion velocity $e_v(k)$ gives the following equation (26):

$$u(0) = C_{cz1}f_L(0) + C_{cz2}f_H(0) + D_z e(0) \quad (26)$$

$$= C_{cz1}(k_{11}e(0) + k_{12}e_v(0)) +$$

$$\quad C_{cz2}(k_{21}e(0) + k_{22}e_v(0)) + D_z e(0)$$

$$= (C_{cz1}k_{11} + C_{cz2}k_{21} + D_z)e(0) + (C_{cz1}k_{12} + C_{cz2}k_{22})e_v(0)$$

In this manner, in the focus servo control system 51 (FIG. 3) which is equivalent to the optical disc apparatus 40 (FIG. 1), it is evident from the equation (26) that the control circuit output initial value u(0) can be calculated based on the conversion location e(k) and conversion velocity $e_v(k)$ which are based on the signal level of the focus error signal SFE.

(1-4) Determination of a Start Position of the Focus Servo Control During Pull-In Operation By the way, the control circuit output initial value u(0) is previously determined as zero: this represents the thrust that can be applied by the actuator 14 (or the thrust not being saturated). This is partly due to the limitation of the thrust applied by the actuator 14 of the optical disc apparatus 40.

During the pull-in operation, the actuator 14 of the optical disc apparatus 40 moves at a constant speed the objective lens 9 toward the optical disc 10.

When the objective lens 9 gets into the detection area AD in FIG. 11B, the characteristic curve Q1 becomes substantially linear. In addition, the objective lens 9 moves at a constant speed. Accordingly, the conversion velocity $e_v(k)$ becomes a constant value (this conversion velocity $e_v(k)$ is also referred to as a "constant velocity $e_{v0}$").

The constant conversion velocity $e_v(k)$ means that the objective lens 9 moving at a constant speed gets into an a range equivalent to the detection area AD of the characteristic curve Q1 (FIG. 11B).

Replacing the conversion velocity $e_v(0)$ of the equation (26) with the constant velocity $e_{v0}$ at that time presents the following equation (27):

$$u(0) = (C_{cz1}k_{11} + C_{cz2}k_{21} + D_z)e(0) + (C_{cz1}k_{12} + C_{cz2}k_{22})e_{v0} \quad (27)$$

In addition, if the conversion location $e(0)$ is expressed as a start location $e_{on}$ when starting the focus servo control, transformation of the equation (27) gives the following equation (28):

$$e_{on} = \frac{u(0) - (C_{cz1}k_{12} + C_{cz2}k_{22})e_{v0}}{C_{cz1}k_{11} + C_{cz2}k_{12} + D_z} \quad (28)$$

The equation (28) indicates that the start location $e_{on}$ can be calculated based on the constant velocity $e_{v0}$ and the control circuit output initial value $u(0)$.

Based on the above, the optical disc apparatus 40, during the pull-in operation, obtains the constant velocity $e_{v0}$ when the conversion velocity $e_v(k)$ becomes a constant level. The optical disc apparatus 40 then performs substitution of the constant velocity $e_{v0}$ and the predetermined control circuit output initial value $u(0)=0$ into the equation (28) to calculate the start location $e_{on}$ related to the focus servo control.

In this manner, the optical disc apparatus 40 determines the control circuit output initial value as $u(0)=0$. The optical disc apparatus 40 then calculates the start location $e_{on}$ related to the focus servo control using the control circuit output initial value $u(0)$ and the constant velocity $e_{v0}$.

After that, the optical disc apparatus 40 observes the conversion location $e(k)$ (or the signal level of the focus error signal SFE). When the conversion location $e(k)$ becomes equal to the start location $e_{on}$, the optical disc apparatus 40 starts the focus servo control. This presents a good response such that the objective lens 9 is brought to the focused focal location JF in a short period of time.

In this case, since the optical disc apparatus 40 calculates the start location $e_{on}$ based on the control circuit output initial value $u(0)=0$, the output of the control circuit is zero at the time instance 0 when the focus servo control is initiated after the objective lens 9 reaches the start location $e_{on}$. Accordingly, it is expected that the thrust applied by the actuator 14 to the objective lens 9 will be well lowered.

Figure 4:
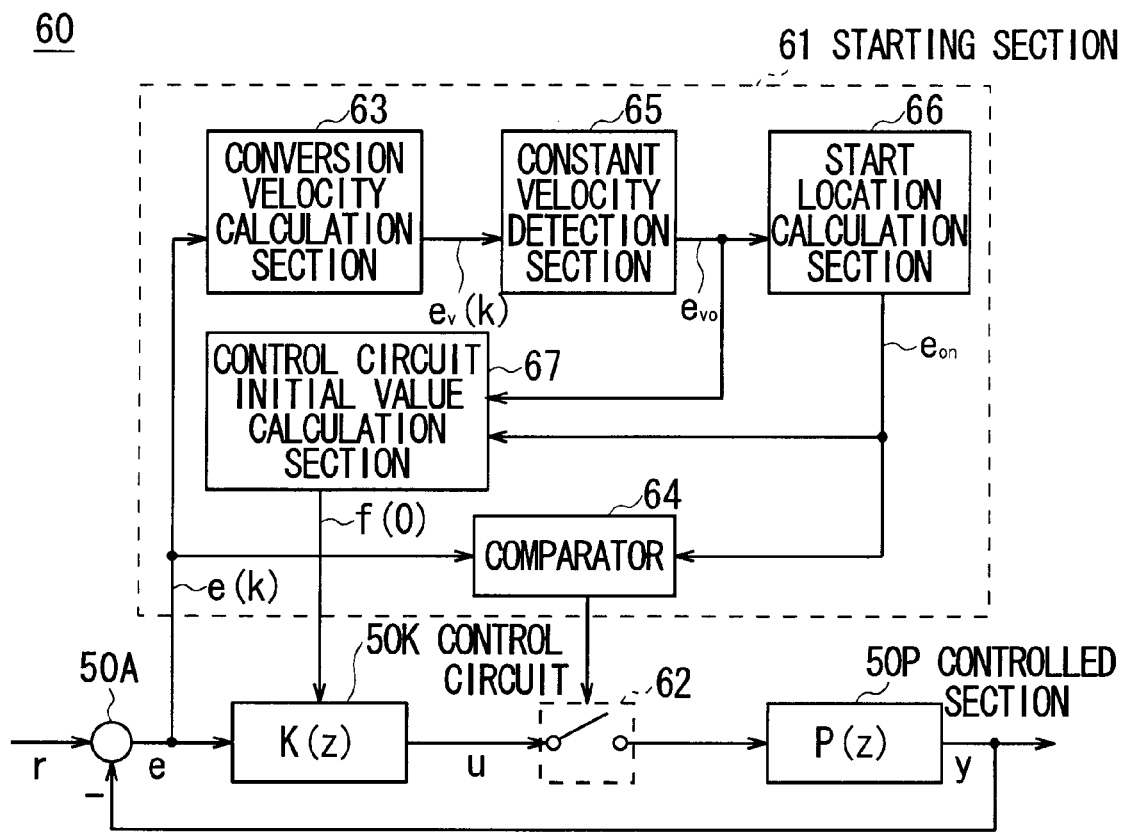
FIG. 4 is a schematic block diagram illustrating the focus servo control system including a starting section.

(1-5) Configuration of the Focus Servo Control System with a Focus Servo Control Starting Section FIG. 4 is a block diagram detailing a focus servo control system 60 of the optical disc apparatus 40: the parts of FIG. 4 are represented as the same reference numerals and symbols as the corresponding parts of FIG. 2. Compared to the focus servo control system 50 in FIG. 2, the focus servo control system 60 includes additional sections: a focus servo control starting section 61 which starts the focus servo control, and a switch 62.

The focus servo control starting section 61 acquires the error signal e (or the conversion location $e(k)$), which is sequentially calculated by the accumulator 50A. The focus servo control starting section 61 supplies the error signal e to a conversion velocity calculation section 63 and a comparator 64. The conversion velocity calculation section 63 calculates, using the equation (23), the conversion velocity $e_v(k)$ based on the conversion location $e(k)$, and then supplies the conversion velocity $e_v(k)$ to a constant velocity detection section 65.

The constant velocity detection section 65 continuously detects the conversion velocity $e_v(k)$. When the constant velocity detection section 65 detects the conversion velocity $e_v(k)$ a predetermined number of times (continuous three clocks, for example) each of which is not zero but within a predetermined range of variation (5%, for example), the constant velocity detection section 65 assumes that the conversion velocity $e_v(k)$ represents a constant speed. At this time, the constant velocity detection section 65 supplies to a start location calculation section 66 and a control circuit initial value calculation section 67 the conversion velocity $e_v(k)$ as the constant velocity $e_{v0}$.

The start location calculation section 66 calculates the start location $e_{on}$ based on the equation (28) with the following values: the constant velocity $e_{v0}$, which is supplied from the constant velocity detection section 65; the coefficients $k_{11}$, $k_{12}$, $k_{21}$ and $k_{22}$, which are calculated based on the equations (19) to (22); the control circuit output initial value $u(0)$, or zero; the predetermined state constant numbers $C_{cz}$ (or ($C_{cz1}$ $C_{cz2}$)) and $D_{cz}$.

The start location calculation section 66 then supplies the start location $e_{on}$ to the comparator 64 and the control circuit initial value calculation section 67.

The control circuit initial value calculation section 67 calculates the control circuit initial value $f(0)$ (or the low-pass filter value $f_L(0)$ and high-pass filter value $f_H(0)$ for the control circuit 50K at a time when the clock is zero) based on the equation (24) with the following values: the start location $e_{on}$; the constant velocity $e_{v0}$; and the coefficients $k_{11}$, $k_{12}$, $k_{21}$ and $k_{22}$, which are calculated based on the equations (19) to (22). The control circuit initial value calculation section 67 then supplies the control circuit initial value $f(0)$ to the control circuit 50K.

The comparator 64 compares the conversion location $e(k)$, which is updated at each clock, with the start location $e_{on}$. When the conversion location $e(k)$ becomes equal to the start location $e_{on}$, the comparator 64 closes or turns the switch 62 on to start the focus servo control of the focus servo control system 60.

In this manner, when the focus servo starting section 61 of the focus servo control system 60 detects that the conversion velocity $e_v(k)$ is constant, the focus servo control system 60 calculates the start location $e_{on}$ based on the constant velocity $e_{v0}$. In addition, the focus servo control system 60 calculates the initial value of the control circuit 50K. After that, the focus servo control system 60 starts the focus servo control when the conversion location $e(k)$ becomes equal to the start location $e_{on}$.

(1-6) Procedure of a Focus Servo Control Starting Process

Figure 5:
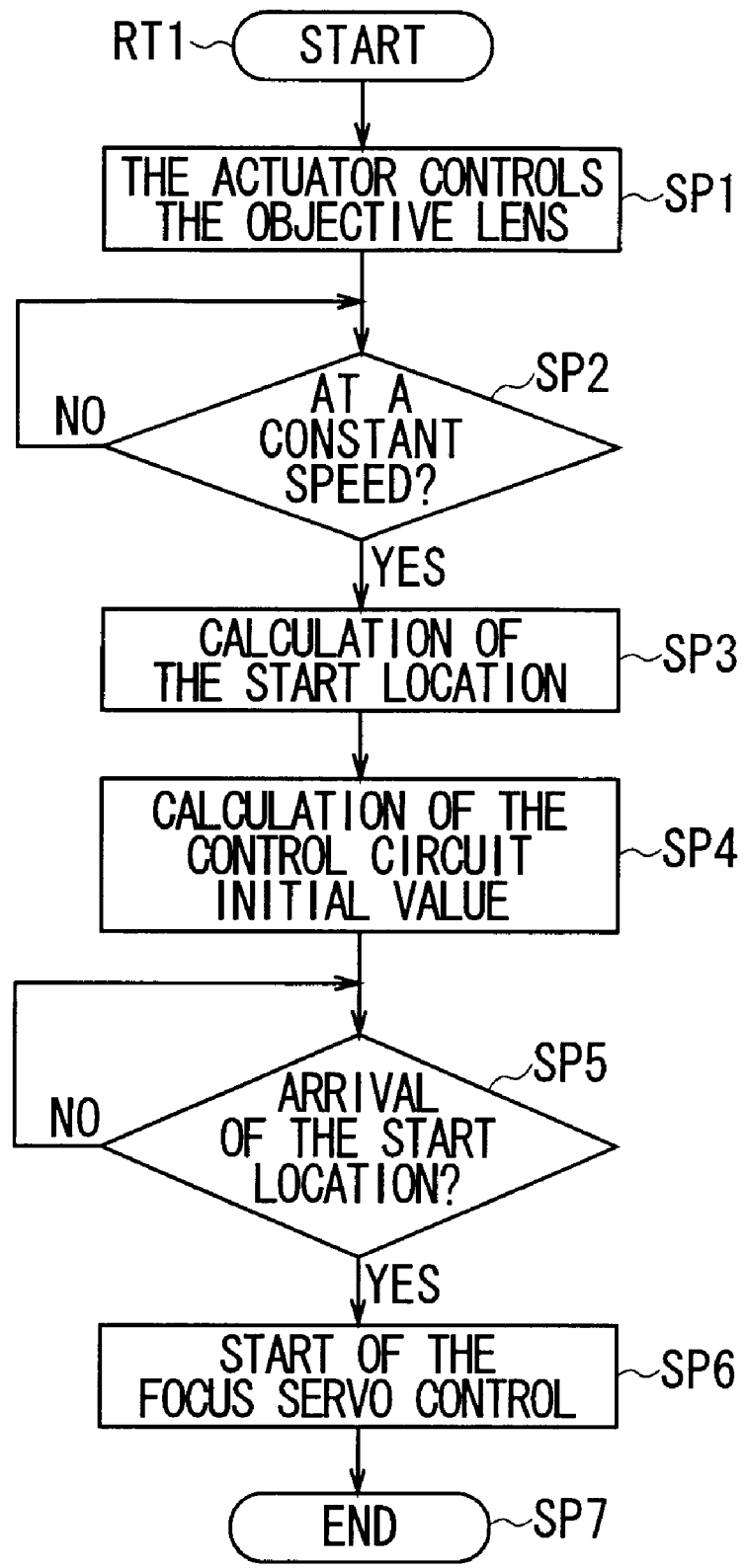
FIG. 5 is a flowchart illustrating a procedure of a focus servo control starting process.

With reference to FIG. 5, a procedure of a focus servo control starting process will be described. The focus servo control starting process is a process for the servo control section 42 of the optical disc apparatus 40 to start the focus servo control.

By the way, the nonvolatile memory 26 (FIG. 1) of the optical disc apparatus 40 has already stored the following data: the state constant numbers $C_{cz}$ (or ($C_{cz1}$ $C_{cz2}$)) and $D_{cz}$; the coefficients $k_{11}$, $k_{12}$, $k_{21}$ and $k_{22}$, which are calculated based on the equations (19) to (22); and the control circuit output initial value $u(0)$, or zero.

For example, the servo control section 42 starts the focus servo control starting process procedure RT1 when the optical disc 10 is inserted into the apparatus. The servo control section 42 proceeds to step SP1.

At step SP1, the servo control section 42 uses the actuator drive circuit 25 to control the actuator 14. The actuator 14 first moves the objective lens 9 toward the outside of the optical disc 10 and then moves the objective lens 9 close to the optical disc 10 at a constant speed. The servo control section 42 subsequently proceeds to next step SP2.

At that time, the focus servo control starting section 61 acquires the error signal e (or the conversion location e(k)), which is sequentially calculated by the accumulator 50A, and then supplies the error signal e to the conversion velocity calculation section 63 and the comparator 64. The conversion velocity calculation section 63 sequentially calculates, based on the equation (23) with the conversion location e(k), the conversion velocity $e_v(k)$, and then supplies the conversion velocity $e_v(k)$ to the constant velocity detection section 65.

At step SP2, the servo control section 42 controls the constant velocity detection section 65 to continuously detect the conversion velocity $e_v(k)$, which is sequentially supplied from the conversion velocity calculation section 63. The servo control section 42 confirms whether to detect the conversion velocity $e_v(k)$ a predetermined number of times (continuous three clocks, for example) each of which is not zero but within a predetermined range of variation (5%, for example).

If the negative result is obtained at step SP2, this means that the conversion velocity $e_v(k)$ is not constant. At this time, the servo control section 42 repeats the process of step SP2.

If the affirmative result is obtained at step SP2, this means that it is possible to assume that the conversion velocity $e_v(k)$ is constant. At this time, the servo control section 42 assumes this conversion velocity $e_v(k)$ as the constant velocity $e_{v0}$, and then controls the constant velocity detection section 65 to supply the constant velocity $e_{v0}$ to the start location calculation section 66 and the control circuit initial value calculation section 67. The servo control section 42 subsequently proceeds to step SP3.

At step SP3, the servo control section 42 controls the start location calculation section 66 to calculate the start location $e_{on}$ based on the equation (28) with the following values: the constant velocity $e_{v0}$; the coefficients $k_{11}$, $k_{12}$, $k_{21}$ and $k_{22}$; the control circuit output initial value u(0), or zero; and the predetermined state constant numbers $C_{cz}$ (or $(C_{cz1}\ C_{cz2})$) and $D_{cz}$. The servo control section 42 supplies the start location $e_{on}$ to the comparator 64 and the control circuit initial value calculation section 67, and then proceeds to next step SP4.

At step SP4, the servo control section 42 controls the control circuit initial value calculation section 67 to calculate the control circuit initial value f(0) based on the equation (24) with the following values: the start location $e_{on}$; the constant velocity $e_{v0}$; and the coefficients $k_{11}$, $k_{12}$, $k_{21}$ and $k_{22}$. The servo control section 42 supplies the control circuit initial value f(0) to the control circuit 50K, and then proceeds to step SP5.

At step SP5, the servo control section 42 controls the comparator 64 to compare the conversion location e(k) with the start location $e_{on}$. The servo control section 42 checks whether the conversion location e(k) exceeds the start location $e_{on}$. If the negative result is obtained at step SP5, this means that the objective lens 9 (FIG. 1), which moves at a constant speed, has not arrived at the start location $e_{on}$ yet. At this time, the servo control section 42 repeats the process of step SP5.

Whereas if the affirmative result is obtained at step SP5, this means that the objective lens 9 has arrived at the start location $e_{on}$. In this case, the servo control section 42 proceeds to step SP6.

At step SP6, the servo control section 42 controls the comparator 64 to turn the switch 64 on to start the focus servo control of the focus servo control system 60. The servo control section 42 then proceeds to next step SP7 and completes the process.

In this manner, the servo control section 42 of the optical disc apparatus 40 performs the focus servo control starting process procedure RT1: the servo control section 42 calculates the start location $e_{on}$ of the focus servo control and the control circuit initial value f(0); and the servo control section 42 starts the focus servo control when the controlled section, or the objective lens 9 reaches the start location $e_{on}$.

(2) Configuration of a Video Camera Recorder

The following describes a video camera recorder according to an embodiment of the present invention.

(2-1) Appearance and Circuit Configuration

Figure 6:
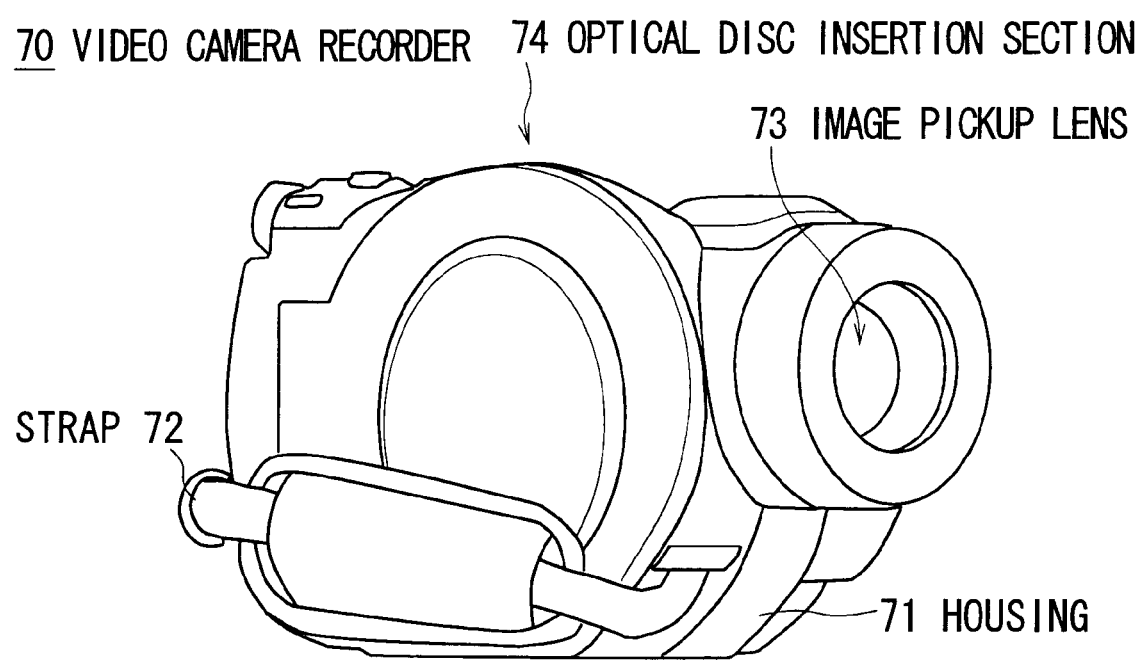
FIG. 6 is a schematic diagram illustrating the overall configuration of a video camera recorder.

As shown in FIG. 6, the video camera recorder 70 has a housing 71. The housing 71 includes various components inside it. Inserting his/her fingers or hand between the housing 71 and a strap 72, the user holds and carries the housing 71.

The video camera recorder 70 includes an image pickup element (described below) to convert an image, which is captured through an image pickup lens 73, into a video signal. The video camera recorder 70 also includes an optical disc insertion section 74 into which an optical disc (described later) is inserted: the video signals are recorded on the optical disc. In addition, the video camera recorder 70 includes an operation section, a display section, a battery and the like (not shown).

By the way, the video camera recorder 70 is designed on the basis that it may be used to capture images while the user is carrying it in his/her hands.

Figure 7:
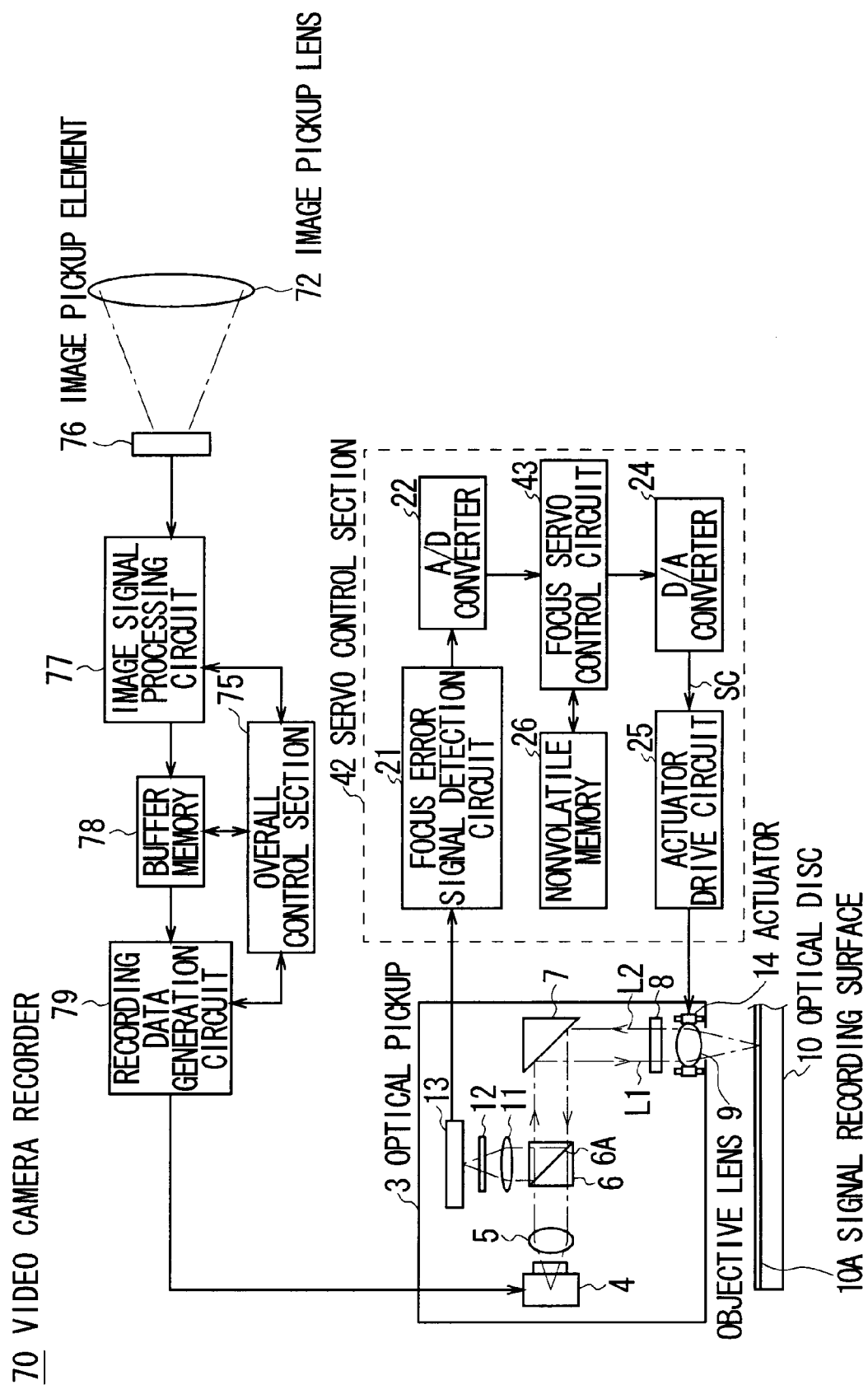
FIG. 7 is a schematic diagram illustrating the circuit configuration of the video camera recorder.

FIG. 7 shows the circuit configuration of the video camera recorder 70. The parts of FIG. 7 are represented as the same reference numerals and symbols as the corresponding parts of FIG. 1. An overall control section 75 takes overall control of the recorder.

When the user operates the recorder to start recording, the overall control section 75 starts controlling the image pickup elements 76 to capture an image through the image pickup lens 72, and generates video signals based on the image. The overall control section 75 then supplies the video signals to a video signal processing circuit 77. The image signal processing circuit 77 performs predetermined processes, such as video processing or compression process, to produce video data. The image signal processing circuit 77 then stores the video data in a buffer memory 78.

A recording signal generation circuit 79 reads out the video data from the buffer memory 78 and performs a predetermined modulation process and the like on the video data to produce recording data, which is suitable for recording on the optical disc 10. The recording signal generation circuit 79 subsequently supplies the recording data to the laser diode 4 of the optical pickup 3. The optical pickup 3 emits, in accordance with the recording data, the optical beam to the signal recording surface 10A of the optical disc 10. In this manner, the recording data is recorded on the optical disc 10.

In this manner, the video camera recorder 70 captures the image through the image pickup lens 72 and records it on the optical disc 10 as the recording data.

On the other hand, the video camera recorder 70 performs a pull-in operation, which is substantially the same as the optical disc apparatus 40 (FIG. 1), when a different optical disc 10 is inserted into the optical disc insertion section 74 or recording of video is started.

The video camera recorder 70 includes the servo control section 42, which is substantially the same as that of the optical disc apparatus 40. This servo control section 42 is equivalent to the focus servo control system 60 (FIG. 4). In addition, the video camera recorder 70 performs the procedure RT1 (FIG. 5) of the focus servo control starting process when performing the pull-in operation.

In reality, when the conversion velocity $e_v(k)$ becomes constant, the servo control section 42 calculates, using the constant velocity $e_{v0}$, the start location $e_{on}$ with the control circuit output initial value $u(0)=0$. In this manner, the servo control section 42 calculates the initial values of the control circuit 50K. After that, the servo control section 42 starts the focus servo control at a time when the conversion location $e(k)$ becomes equal to the start location $e_{on}$, or when the controlled section (the objective lens 9) reaches the start location $e_{on}$.

(2-2) Start of the Focus Servo Control during the Pull-In Operation

Figure 8A:
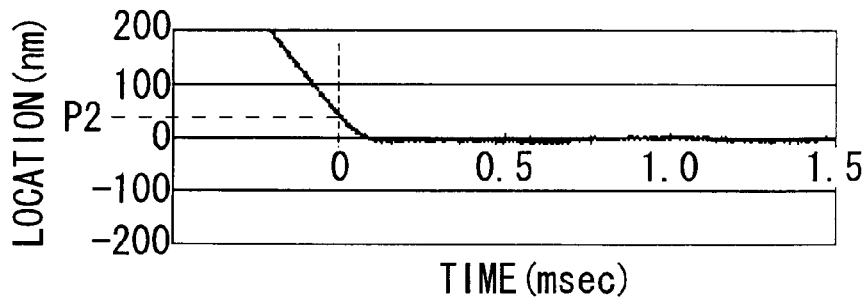
FIGS. 8A and 8B are schematic diagrams illustrating a position and a thrust when a focus servo control process is initiated.
Figure 8B:
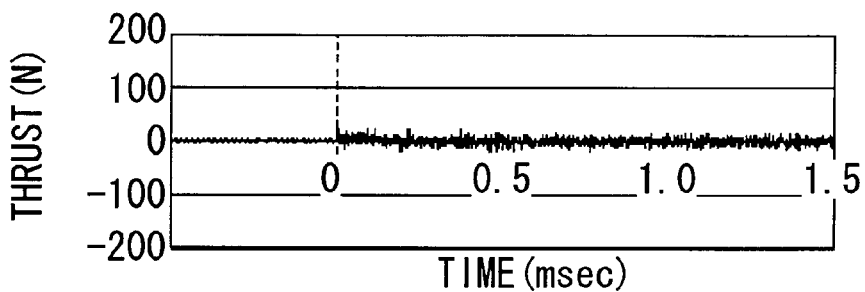
Figure 17A:
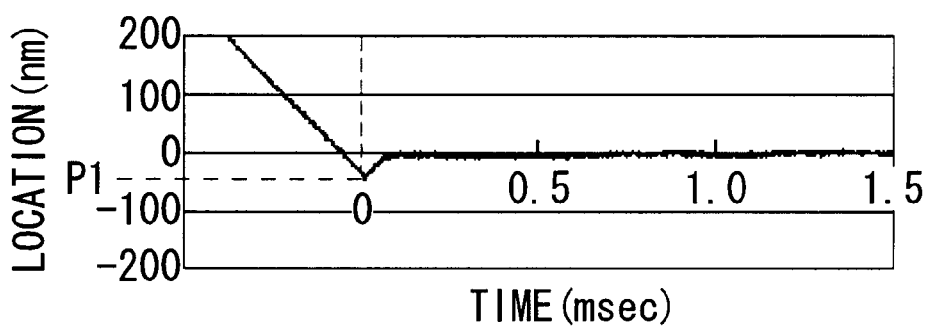
FIGS. 17A and 17B are schematic diagrams illustrating a position and a thrust when the typical focus servo control process is initiated.

FIG. 8A shows the result of measuring the position of the objective lens 9 with respect to the focused focal location JF when the video camera recorder 70 starts the focus servo control during the pull-in operation: FIG. 8A can be compared with FIG. 17A. FIG. 8B shows the result of measuring the thrust applied by the actuator 14 to the objective lens 9: FIG. 8B can be compared with FIG. 17B.

As shown in FIG. 8A, the video camera recorder 70 detects the location P2, which is a location before the objective lens 9 reaches the focused focal location JF, as the start location $e_{on}$. When the objective lens 9 arrives at the start location $e_{on}$, the video camera recorder 70 starts the focus servo control (this time is also referred to as a "time instant 0").

Figure 17B:
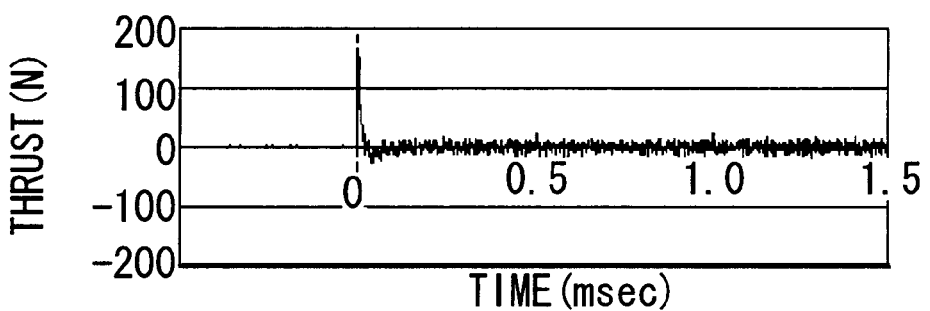

It is evident from FIG. 8B that the thrust of the actuator 14 is well suppressed compared to the result in FIG. 17B.

After that, the video camera recorder 70 can bring the objective lens 9 onto the focused focal location at a time instance of 0.1 msec as shown in FIG. 8A. During this period, the thrust of the actuator 14 is continuously well suppressed as shown in FIG. 8B.

In this manner, the video camera recorder 70 performs the focus servo control starting process procedure RT1 during the pull-in operation. This enables the video camera recorder 70 to minimize the thrust of the actuator 14 and to bring the objective lens 9 onto the focused focal location JF in a short period of time.

(3) Operation and Effect

When the conversion velocity $e_v(k)$ becomes constant during the pull-in operation, the servo control section 42 of the video camera recorder 70 calculates, using the constant velocity $e_{v0}$, the start location $e_{on}$ with the control circuit output initial value $u(0)=0$. In addition, the servo control section 42 calculates the initial values of the control circuit 50K. When the conversion location $e(k)$ becomes equal to the start location $e_{on}$, the servo control section 42 starts the focus servo control.

In this manner, the servo control section 42 sets the control circuit output initial value $u(0)$ as zero even if it uses the initial value compensation method. Accordingly, the thrust applied by the actuator 14 to the objective lens 9 can be minimized at the time instant 0 when the focus servo control is initiated (FIG. 8B).

Therefore, the servo control section 42 can prevent the saturation of the thrust applied by the actuator 14. Thus, the servo control section 42 can present a good transient response, which is really close to the ideal value, even following the premise of the initial value compensation method. As a result, the servo control section 42 can bring the objective lens 9 onto the focused focal location JF in a very short period of time with high precision (FIG. 8A).

In this case, the servo control section 42 minimizes the thrust at the time instant 0 when the focus servo control is initiated, compared to the case in which the initial value compensation method is used without setting of the control circuit output initial value $u(0)$ (FIG. 17B). This enables the servo control section 42 to bring the objective lens 9 to the focused focal point JF in a very short period of time.

In other words, the typical initial value compensation methods produce various values as the control circuit output initial value because the calculation of the control circuit initial value is performed based on the initial values such as location and velocity. On the other hand, the servo control section 42 according to an embodiment of the present invention limits the control circuit output initial value when using the initial value compensation method: after setting the initial value of velocity, the servo control section 42 calculates the initial value of location, or the start position of the focus servo control to obtain the control circuit initial value $f(0)$. That presents good response characteristics while preventing the saturation of the thrust applied by the actuator 14.

To prevent the saturation of the thrust of the actuator 14, there may be another method: this method for example temporarily turns down the focus servo control during the pull-in operation to suppress the thrust of the actuator 14.

However, the video camera recorder 70 may receive the impact from the outside due to the accidents of the user who is carrying and using the video camera recorder 70 to record images on the optical disc 10.

This impact may send the objective lens 9 deviating from its path. In this case, the above method of turning down the focus servo control during the pull-in operation may take time to re-start the pull-in operation.

On the other hand, the servo control section 42 of the video camera recorder 70 can always perform the strong focus servo control. This control prevents the deviation of the focus servo even when the video camera recorder 70 receives the impact. Even if the deviation of the focus servo happens, the servo control section 42 can re-start the pull-in operation in a relatively short period of time.

There is also another method: this method temporarily slows down the rotation of the optical disc during the pull-in operation to lower the focus servo control, which prevents the saturation of the thrust of the actuator. However, this method takes time to change the rotation speed of the optical disc.

In addition, there is a demand that a video camera recorder should always record the image data on a recording media precisely, because there may be only one chance for the user to capture a certain scene. Accordingly, a video camera recorder including an optical disc apparatus is usually equipped with a buffer memory to temporarily store the image data before recording it on the optical disc. This can prevent the loss of data, but the capacity of the buffer memory is limited.

This means that if the video camera recorder including the optical disc apparatus takes time to change the rotation speed of the optical disc during the pull-in operation, the buffer memory may lose the image data due to the lack of its capacity.

On the other hand, the video camera recorder 70 does not slows down the rotation of the optical disc 10 during the pull-in operation while preventing the saturation of the thrust of the actuator 14. Accordingly, the video camera recorder 70, which can complete the pull-in operation in a short period of time, can also prevent the loss of the image data that should be recorded on the optical disc 10.

According to the above configuration, when the conversion velocity $e_v(k)$ becomes constant during the pull-in operation, the servo control section 42 of the video camera recorder 70 calculates, using the constant velocity $e_{v0}$, the start location $e_{on}$, with the control circuit output initial value $u(0)=0$. In addition, the servo control section 42 calculates, in accordance with the initial value compensation method, the control circuit initial value $f(0)$. When the conversion location $e(k)$ becomes equal to the start location $e_{on}$, the servo control section 42 starts the focus servo control. In this manner, the servo control section 42 prevents the saturation of the thrust of the actuator 14 at the time instant 0 when the focus servo control is initiated. This presents a good transient response. In addition, the servo control section 42 can bring the objective lens 9 onto the focused focal position JF in a very short period of time.

(4) Other Embodiments

In the above-noted embodiments, at step SP4 in the procedure RT1 (FIG. 5) of the focus servo control starting process, the control circuit initial value calculation section 67 (FIG. 4) calculates the control circuit initial value $f(0)$ based on the equation (24) with the start location $e_{on}$ and the constant velocity $e_{v0}$. However, the present invention is not limited to this. There may be another method: the control circuit initial value calculation section 67 at step SP4 acquires the conversion location $e(k)$ and the conversion velocity $e_v(k)$ from the accumulator 50A and the conversion velocity calculation section 63 and calculates the control circuit initial value $f(0)$ using these values with the equation (24).

In this case, it may take a period of one clock (one sampling period of time T) to start the focus servo control after acquiring the conversion location $e(k)$ and the conversion velocity $e_v(k)$. Accordingly, the estimated values of the conversion location $e(k)$ and conversion velocity $e_v(k)$, or a conversion location predictive value $e_p(k)$ and a conversion velocity predictive value $e_{vp}(k)$ may be calculated based on the following equations (29) and (30):

$$e_p(k)=e(k)+T\cdot e_v(k) \quad (29)$$

and $$e_{vp}(k)=e_v(k)+(e_v(k)-e_v(k-1)) \quad (30)$$

Based on the result of calculation, the control circuit initial value $f(0)$ may be calculated. This improves the accuracy of the focus servo control.

Moreover, in the above-noted embodiment, the start location $e_{on}$ is calculated based on the equation (28) with the control circuit output initial value $u(0)=0$. However, the present invention is not limited to this. The control circuit output initial value $u(0)$ may be set at a relatively small value other than zero in so far as the thrust, applied by the actuator 14 to the objective lens 9 at the time instant 0 when the focus servo control is initiated, does not exceed the upper limitation of the actuator 14 (or in so far as the thrust is not saturated).

Furthermore, in the above-noted embodiment, the coefficients $k_{11}$, $k_{12}$, $k_{21}$ and $k_{22}$ are calculated based on one of the methods described in the Non-Patent Document 1, or "Design of Initial Value Compensation Servo System with Zero Point Specified". However, the present invention is not limited to this. The coefficients $k_{11}$, $k_{12}$, $k_{21}$ and $k_{22}$ may be calculated based on other methods, such as another method described in the Non-Patent Document 1 like "Design by Evaluation Function Minimization".

Furthermore, in the above-noted embodiment, the focus error signal SFE represents the S-shaped characteristic curve Q1 as shown in FIG. 11B. However, the present invention is not limited to this. The focus error signal SFE may represent the differently-shaped characteristic curve with a substantially linier section inside the detection area AD.

Furthermore, in the above-noted embodiment, when the conversion velocity $e_v(k)$ can be assumed as a constant speed, the apparatus determines that the objective lens 9 has entered the detection area AD. However, the present invention is not limited to this. Other detection means may be used to detect the objective lens 9 getting into the detection area AD.

Furthermore, the method according to an embodiment of the present invention is applied to the focus servo control system of the optical disc apparatus 40. However, the present invention is not limited to this. This method may be applied to other servo control systems which start servo control after calculating the start position of the servo control: the tracking servo control system of the optical disc apparatus 40, the head positioning servo control system of a magnetic disk apparatus and the like.

Furthermore, in the above-noted embodiment, the optical disc apparatus 40, which is equivalent to a servo control apparatus, includes: the actuator 14 and actuator drive circuit 25, which are equivalent to a drive section; the nonvolatile memory 26, which is a storage section; the focus servo control circuit 43, which is equivalent to an approaching control section; the photodetector 13 and focus error signal detection circuit 21, which are equivalent to an error signal calculation section; the start location calculation section 66, which is equivalent to a start position calculation section; the comparator 64, which is equivalent to an arrival detection section; the control circuit initial value calculation section 67, which is equivalent to a control circuit initial value calculation section; and the comparator 64 and switch 62, which are equivalent to a servo control starting section. However, the present invention is not limited to this. The servo control apparatus may be designed in a different way, including the differently-configured drive section, storage section, approaching control section, error signal detection section, start position calculation section, arrival detection section, control circuit initial value calculation section and servo control starting section.

The method according to an embodiment of the present invention can be applied to various servo control systems.

It should be understood by those skilled in the art that various modifications, combinations, sub-combinations and alterations may occur depending on design requirements and other factors insofar as they are within the scope of the appended claims or the equivalents thereof.

What is claimed is:

1. A servo control apparatus comprising:
   a drive section that applies a thrust to a driven object to move the driven object in a predetermined direction;
   a storage section that stores a control circuit output initial value that the drive section first applies;
   an approaching control section that controls the drive section to move the driven object toward a target position;
   an error signal detection section that detects an error signal varying according to a difference between the position of the driven object and the target position;
   a start position calculation section that calculates, based on a velocity of the driven object moving toward the target position and the control circuit output initial value, a start position of a servo control process that brings the driven object to the target position, the velocity of the driven object being calculated based on the error signal;
   an arrival detection section that detects, based on the error signal, whether the driven object reaches the start position;

a control circuit initial value calculation section that calculates, using a velocity of the driven object that has reached the start position and the start position, a control circuit initial value of a control system related to the driven object and supplies the control circuit initial value to a control circuit of the control system; and a servo control starting section that starts the servo control process when detecting that the driven object has reached the start position.

2. The servo control apparatus according to claim 1, wherein the error signal changes linearly with respect to the difference around the target position; and the start position calculation section calculates the start position of the servo control process within a range in which the error signal changes linearly with respect to the difference.

3. The servo control apparatus according to claim 1, wherein the approaching control section controls the drive section to move the driven object toward the target position at a constant speed; and the control circuit initial value calculation section calculates, assuming a velocity of the driven object when the start position is calculated as the velocity of the driven object that has reached the start position, the control circuit initial value.

4. The servo control apparatus according to claim 1, wherein the storage section stores the control circuit output initial value as set at zero.

5. A servo control method comprising:

an approaching control step of moving a driven object toward a target position using a drive section that applies a thrust to the driven object to move the driven object in a predetermined direction;

an error signal detection step of detecting an error signal varying according to a difference between the position of the driven object and the target position;

a start position calculation step of calculating, based on a velocity of the driven object moving toward the target position and a control circuit output initial value that the drive section first applies, a start position of a servo control process that brings the driven object to the target position, the velocity of the driven object being calculated based on the error signal and the control circuit output initial value being within a range of values that the drive section can apply;

an arrival detection step of detecting, based on the error signal, whether the driven object reaches the start position;

a control circuit initial value calculation step of calculating, using a velocity of the driven object that has reached the start position and the start position, a control circuit initial value of a control system related to the driven object and supplying the control circuit initial value to a control circuit of the control system; and a servo control starting step of starting the servo control process when detecting that the driven object has reached the start position.

6. An optical disc apparatus that records or reproduces information from a storage medium or an optical disc by focusing an emitted optical beam on the optical disc, the optical disc apparatus comprising:

an actuator that applies a thrust to an objective lens collecting the optical beam toward a signal recording surface of the optical disc to move the objective lens such that the objective lens gets close or away from the optical disc;

a storage section that stores a control circuit output initial value that the actuator first applies, the control circuit output initial value being within a range of values that the actuator can apply;

an approaching control section that controls the actuator to move the objective lens toward a focused focal position when reproduction or recording of the information on the optical disc is initiated;

an error signal detection section that detects an error signal varying according to a difference between the position of the objective lens and the focused focal position;

a start position calculation section that calculates, based on a velocity of the objective lens moving toward the focused focal position and the control circuit output initial value, a start position of a servo control process that brings the objective lens to the focused focal position, the velocity of the objective lens being calculated based on the error signal;

an arrival detection section that detects, based on the error signal, whether the objective lens reaches the start position;

a control circuit initial value calculation section that calculates, using a velocity of the objective lens that has reached the start position and the start position, a control circuit initial value represented in a block diagram of a control system related to the objective lens and supplies the control circuit initial value to a control circuit represented in the block diagram; and a servo control starting section that starts the servo control process when detecting that the objective lens has reached the start position.

7. The optical disc apparatus according to claim 6, wherein the error signal changes linearly with respect to the difference only around the focused focal position;

the approaching control section controls the actuator to move the objective lens toward the focused focal position at a constant speed; and the start position calculation section calculates, when detecting that the velocity of the objective lens moving toward the focused focal position, calculated based on the error signal, substantially becomes constant, the start position of the servo control process based on this velocity and the initial thrust.

8. A video camera recorder that generates a video signal by shooting a video image and records the video signal on a storage medium or an optical disc by focusing an emitted optical beam on the optical disc, the video camera recorder comprising:

an image pickup section that converts the video image into the video signal;

an actuator that applies a thrust to an objective lens collecting the optical beam toward a signal recording surface of the optical disc to move the objective lens such that the objective lens gets close or away from the optical disc;

a storage section that stores a control circuit output initial value that the actuator first applies, the control circuit output initial value being within a range of values that the actuator can apply;

an approaching control section that controls the actuator to move the objective lens from a position distant from a focused focal position of the optical disc toward the focused focal position when recording of the video signal on the optical disc is initiated;

an error signal detection section that detects an error signal varying according to a difference between the position of the objective lens and the focused focal position;

a start position calculation section that calculates, based on a velocity of the objective lens moving toward the focused focal position and the control circuit output initial value, a start position of a servo control process in which the actuator brings the objective lens to the focused focal position in accordance with the error signal, the velocity of the objective lens being calculated based on the error signal;

an arrival detection section that detects, based on the error signal, whether the objective lens reaches the start position;

a control circuit initial value calculation section that calculates, using a velocity of the objective lens that has reached the start position and the start position, a control circuit initial value represented in a block diagram of a control system related to the objective lens and supplies the control circuit initial value to a control circuit represented in the block diagram; and a servo control starting section that starts the servo control process when detecting that the objective lens has reached the start position.

* * * * *